United States Patent
Palakovich et al.

(10) Patent No.: US 9,559,993 B2
(45) Date of Patent: Jan. 31, 2017

(54) VIRTUAL AGENT PROXY IN A REAL-TIME CHAT SERVICE

(71) Applicant: Oracle International Corporation, Redwood Shores, CA (US)

(72) Inventors: James Palakovich, Bozeman, MT (US); Jeffry Eigeman, Alpharetta, GA (US); Charles Edward McDaniel, Jr., Seattle, WA (US); Michael Maringas, West Palm Beach, FL (US); Sridhar Chodavarapu, Suwanee, GA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 171 days.

(21) Appl. No.: 14/505,286

(22) Filed: Oct. 2, 2014

(65) Prior Publication Data

US 2016/0099892 A1 Apr. 7, 2016

(51) Int. Cl.
G06F 15/16 (2006.01)
H04L 12/58 (2006.01)
H04L 12/18 (2006.01)

(52) U.S. Cl.
CPC ............ *H04L 51/04* (2013.01); *H04L 51/02* (2013.01); *H04L 12/1827* (2013.01)

(58) Field of Classification Search
USPC .................................................. 709/206, 207
See application file for complete search history.

(56) References Cited

U.S. PATENT DOCUMENTS 8,279,779 B2 * 10/2012 Singh .................. H04L 41/0681
370/260
8,737,600 B2 * 5/2014 Kamlet ............... H04M 3/5233
379/265.11

(Continued)

FOREIGN PATENT DOCUMENTS

WO 02/09399 A2 1/2002

OTHER PUBLICATIONS

Moxie Software, Inc. "VirtuOz Announces Availability of Packaged Integration With Moxie Software's Chat Spaces". News and Press (/About/News/) [online]. Sep. 6, 2012 [retrieved Jun. 5, 2014]. Retrieved from the Internet: <URL: http://www.gomoxie.com/press/moxie-announces-virtuoz-integration>, 3 pages.

(Continued)

*Primary Examiner* — Melvin H Pollack
(74) *Attorney, Agent, or Firm* — Kilpatrick Townsend & Stockton LLP

(57) ABSTRACT

Techniques are disclosed for implementing real-time chat systems including virtual agents as chat participants, and more specifically, to the use of a virtual agent proxy in a real-time chat service. Certain techniques are disclosed that allow for seamless chat transitions between virtual agents and live agents. A chat server may include a virtual agent (VA) proxy module. The VA proxy module intercepts messages received at the chat server from end users, forwards them to virtual agents, and posts responses from the virtual agents back to be displayed to the corresponding end users. The VA proxy module thereby loosely couples virtual agents to the chat server, allowing the virtual agents to participate in chats just as live agents do. The chat server may determine that chat escalations and de-escalations are to occur, and can provide a full transcript of the chat to new chat participants.

20 Claims, 9 Drawing Sheets

(56) References Cited

U.S. PATENT DOCUMENTS

| | | | | |
|---|---|---|---|---|
| 8,737,956 B2* | 5/2014 | Stenfelt | ............. | H04W 4/24 455/406 |
| 8,787,553 B2* | 7/2014 | Fan | ............. | H04M 3/5166 379/265.09 |
| 8,898,344 B2* | 11/2014 | Frank | ............. | G06F 17/28 710/17 |
| 8,918,459 B2* | 12/2014 | Smyth | ............. | H04L 12/581 370/260 |
| 8,976,955 B2* | 3/2015 | Liberman Ben-Ami | ............. | H04M 3/5191 379/265.01 |
| 8,983,975 B2* | 3/2015 | Kenton | ............. | G06Q 30/00 706/12 |
| 9,106,749 B2* | 8/2015 | Schultz | ............. | H04M 3/5233 |
| 9,189,742 B2* | 11/2015 | London | ............. | G06N 5/04 |
| 9,201,960 B2* | 12/2015 | Singh | ............. | G06F 17/30861 |
| 9,262,175 B2* | 2/2016 | Lynch | ............. | G06Q 10/02 |
| 2007/0168457 A1* | 7/2007 | Huerta | ............. | G06Q 30/02 709/217 |
| 2013/0346886 A1 | 12/2013 | Cauchois et al. | | |
| 2014/0229405 A1* | 8/2014 | Govrin | ............. | G06Q 40/02 706/11 |
| 2014/0279050 A1* | 9/2014 | Makar | ............. | G06Q 30/0269 705/14.66 |
| 2015/0286487 A1* | 10/2015 | Glass | ............. | H04M 3/51 715/707 |
| 2015/0294405 A1* | 10/2015 | Hanson | ............. | G06Q 40/02 705/44 |
| 2015/0324772 A1* | 11/2015 | Sarris | ............. | G06Q 20/108 705/42 |

OTHER PUBLICATIONS

Oracle RightNow CX Cloud Service. Release Notes. Oracle Corporation. Nov. 18, 2013. 14 pages.

Oracle RightNow Virtual Assistant Cloud Service. Datasheet. [online]. Oracle Corporation. 2013. Retrieved from the Internet: <URL: http://www.oracle.com/us/media1/m-virtual-assistant-cloud-service-1676861.pdf >, 2 pages.

Oracle Service Cloud Nov. 2013 Release Capabilities & Benefits. Datasheet. Oracle Corporation. 2013. Retrieved from the Internet: <URL: http://www.oracle.com/us/media1/rightnow-nov-2013-2059652.pdf>, 3 pages.

Moxie Live Chat. Datasheet [online]. Moxie Software, Inc. 2014 [retrieved Jun. 5, 2014]. Retrieved from the Internet: <URL: http://www.gomoxie.com/live-chat/ss-live-chat.pdf>, 2 pages.

Nina Web for Moxie Live Chat. Datasheet [online]. Moxie Software, Inc. 2014 [retrieved Jun. 5, 2014]. Retrieved from the Internet: <URL: http://www.gomoxie.com/live-chat/ds-chat-nuance.pdf>, 2 pages.

VirtuOz Integration. YouTube video and YouTube-generated transcript [online]. Moxie Software, Inc. Apr. 7, 2013 [retrieved Sep. 11, 2014]. Retrieved from the Internet: <URL: https://www.youtube.com/watch?v=cnqC0UCYg5w>, 24 pages.

\* cited by examiner

VIRTUAL AGENT PROXY IN A REAL-TIME CHAT SERVICE

FIELD

Embodiments of the invention relate to the field of computing systems; and more specifically, to the use of a virtual agent proxy in a real-time chat service for seamless transitions between virtual agents and live agents.

BACKGROUND

With advances in the field of natural language processing and voice recognition, the implementation of virtual assistants (also referred to herein as "virtual agents" or "VAs") has flourished, allowing users to have access to personalized services that previously could only be provided by a real human. For example, some telephonic virtual agents provide static and/or dynamic information to the users via audio communications over a telephone call. Other virtual agents execute on user computing devices, such as smartphones and tablet computers, and provide access to a variety of services. For example, Siri® is a virtual agent available on some devices from Apple Computers, Inc., and the applications Google Now™ and several other virtual agents can be installed on user computing devices. Another type of virtual agent is utilized within the context of a real-time chat, such as a text or audio chat occurring at a merchant's website between a consumer and a representative of the merchant.

Some virtual agents are programmed to assist a user in performing various tasks. For example, a virtual agent may be programmed to send electronic messages, make appointments, place phone calls, and get directions. In completing such tasks, the virtual agent may interact with other applications (e.g., an email client) and may search for information either locally (e.g., from a user's electronic address book) or via one or more networks (e.g., from the World Wide Web, or Internet).

In the context of real-time chats, virtual agents are often configured to provide "self-service" content to consumers by providing answers to common questions. These virtual agent (VA) solutions are deployed to represent brands and to serve as an online customer service representative to guide the consumer to find information and answer their questions.

However, with many virtual agents, when an interaction is not successful (i.e., the VA is unable to understand or answer a user's question), the user may be redirected to other support channels. For example, some virtual agents in a real-time chat may respond to a customer question by stating, "Sorry, I couldn't answer your question, please call customer service at 1-800- . . . " In other real-time chat implementations, when a virtual assistant is unable to assist a consumer, the consumer is redirected to another real-time chat with a "live" agent (i.e., a human), and must begin describing the situation to provide context for their questions all over again. In these scenarios, the consumer begins a real-time chat with a VA with the intention of solving their issue in real-time, but then needs to leave that conversational channel to continue the support interaction, mostly restarting the interaction from scratch, which ultimately creates a very poor customer experience.

Some approaches to eliminating the problems associated with imperfect virtual agents have been developed. For example, one approach involves building an integration between virtual agent technology and a live chat through "Guided Assistance" based on decision trees, which are used to present information to users in a human-like conversational form (or, as a knowledge search). When an escalation point is reached in the decision tree (i.e., a point in which the virtual agent may no longer provide assistance), a link (or URL) is presented to the user to allow the user to "escalate" to a live chat agent. This chat link, when selected by the user, opens a new chat module on the user's screen, and at most passes the last question asked by the consumer to the live chat agent. However, this approach keeps the virtual agent and the live agent separated from each other, and the live agent is, at most, only aware of a last question (or statement) entered by the consumer and is unaware of what has been discussed. Additionally, the live agent (or another human user, such as a supervisor) has no real visibility into what the virtual agent is doing with real consumers, or how well they are performing. Another approach includes utilizing virtual agents on the "backend" of a chat, such that the virtual agent does not directly interact with a consumer, but instead the virtual agent provides suggested responses to the live agent, which are only visible to the live chat agent. However, this approach does not fully utilize the original stated benefit of virtual agents, which is the reduction of the need for humans to be available to service routine consumer interactions.

Accordingly, there is a need for utilizing virtual agents within automated support channels with human-assisted customer support tools to provide flexible, economical, easily-managed, and effective chat-based assistance to consumers.

BRIEF SUMMARY

The present disclosure relates generally to real-time chat systems including virtual agents as chat participants, and more specifically, to the use of a virtual agent proxy in a real-time chat service. Certain techniques are disclosed that allow for seamless chat transitions between virtual agents and live agents.

In some embodiments, a chat server comprises a virtual agent (VA) proxy module. In certain embodiments, for a chat including at least an end user and a virtual agent, the VA proxy module intercepts messages received at the chat server from the end user, forwards them to the virtual agent, and posts responses from the virtual agents back to be displayed at a chat dialog. Accordingly, in some embodiments the VA proxy module allows virtual agents to be loosely coupled with the chat server, and thus participate in chats just as a live agent would. In some embodiments, the VA proxy module comprises a proxy thread inside the chat server.

According to some embodiments, the chat server is configured to determine whether an "escalation" of the chat—e.g., when a live agent is to be added to a chat—is to occur. For example, an escalation may involve adding a live agent to a chat previously between an end user and a virtual agent. As another example, an escalation may involve adding a different live agent (e.g., a live agent in a supervisor role, for example) to a chat previously between an end user and a first live agent. Similarly, according to some embodiments the chat server may be configured to determine whether a "de-escalation" of the chat is to occur. A de-escalation may involve adding a virtual agent to a chat previously between an end user and a live agent, and/or may involve adding a different live agent to a chat previously between another live agent and an end user. In various embodiments, the addition of a "new" agent—whether live or virtual—may or may not coincide with a removal of a previous agent.

According to some embodiments, a method performed by a chat server executing at a computing device is described for providing a real-time chat service using a virtual agent proxy. In some embodiments, the method includes receiving, at the chat server, a first message for a chat from a client device of an end user. The chat involves multiple chat participants including at least the end user and a virtual agent. The method further includes updating a chat log based upon the first message, and sending the first message to the virtual agent via the virtual agent proxy. The method also includes receiving a second message via the virtual agent proxy that was originated by the virtual agent in response to the first message, updating the chat log based upon the second message, and sending the second message to the client device. The method also includes determining that the chat is to be escalated from the virtual agent to a live agent, and causing a full transcript of the chat log to be transmitted to a second client device utilized by the live agent. The full transcript includes at least the first message and the second message. In some embodiments, the full transcript of the chat log is output to the live agent via a display device, thereby providing a history of the chat—prior to the entry of the live agent to the chat—to the live agent.

According to some embodiments, a non-transitory computer readable storage medium stores instructions that, when executed by one or more processors of a computing device, causing the computing device to implement a chat server and perform operations. In some embodiments, the operations cause the computing device to provide a real-time chat service using a virtual agent proxy. In some embodiments, the operations include receiving, at the chat server, a first message for a chat from a client device of an end user. The chat involves multiple chat participants including at least the end user and a virtual agent. The operations further include updating a chat log based upon the first message, and sending the first message to the virtual agent via the virtual agent proxy. The operations also include receiving a second message via the virtual agent proxy that was originated by the virtual agent in response to the first message, updating the chat log based upon the second message, and sending the second message to the client device. The operations also include determining that the chat is to be escalated from the virtual agent to a live agent, and causing a full transcript of the chat log to be transmitted to a second client device utilized by the live agent. The full transcript includes at least the first message and the second message. In some embodiments, the full transcript of the chat log is output to the live agent via a display device, thereby providing a history of the chat—prior to the entry of the live agent to the chat—to the live agent.

The foregoing, together with other features and embodiments will become more apparent upon referring to the following specification, claims, and accompanying drawings.

DETAILED DESCRIPTION

Figure 1:
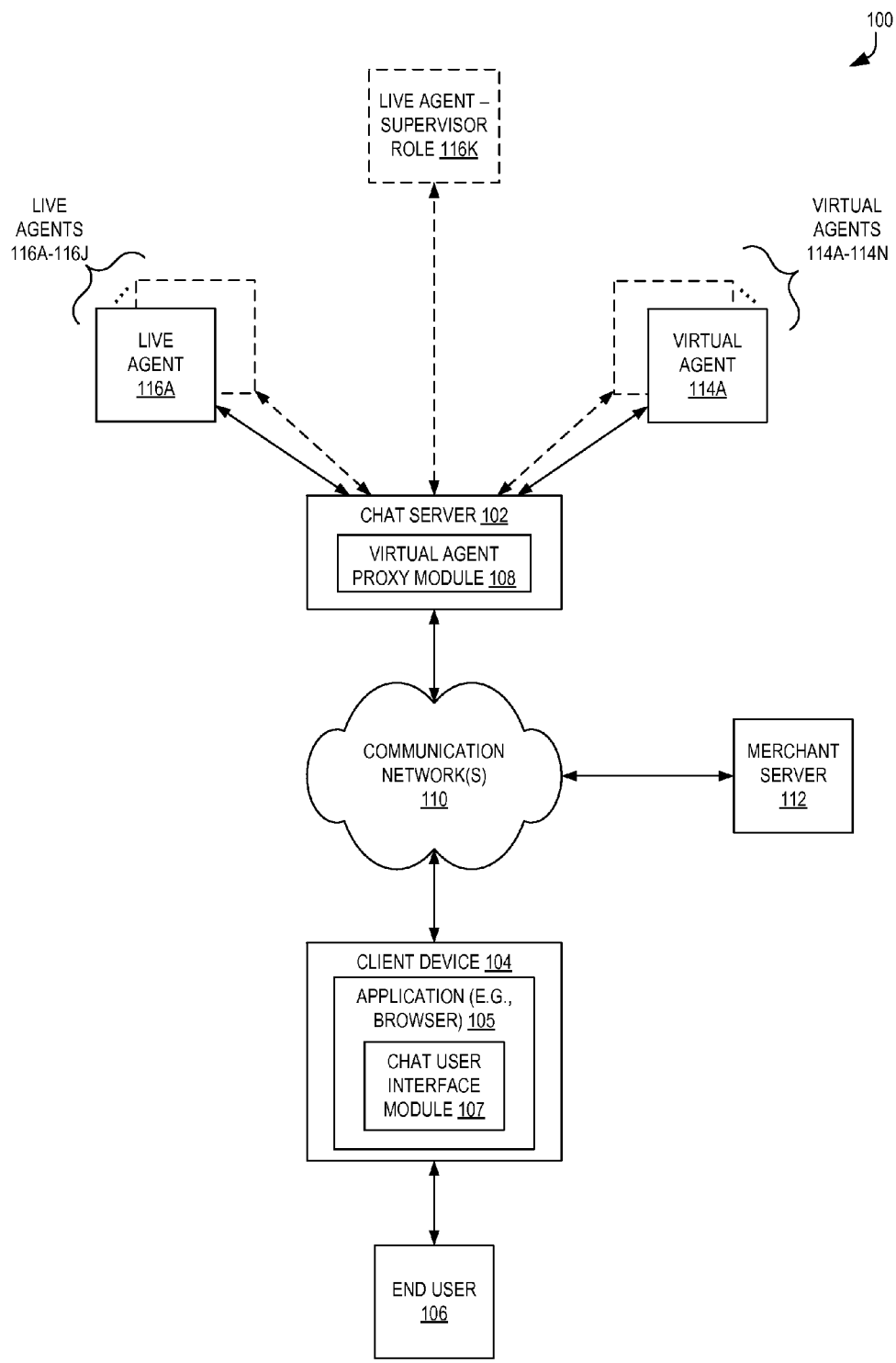
FIG. 1 illustrates a simplified high level block diagram and conceptual overview of an improved real-time chat service system utilizing a virtual agent proxy according to some embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The present disclosure relates generally to real-time chat systems including virtual agents as chat participants. In certain embodiments, a chat server provides chat functionalities for one or more participants including an end user and one or more representatives. The one or more representatives may include a virtual agent, a live agent, or various combinations thereof. The chat server may also allow for live agents in a supervisory role, and these live agents may or may not be visible to other participants of the chat.

In some embodiments, a user browses a website of a merchant using a browser executing on a client device and is presented with a user interface input element. Upon a selection of the user interface input element by the user, a chat user interface module may be launched by the client device and a chat initialization message may be transmitted to a chat server. The chat server may be executed at a same computing device as the merchant webserver providing the website or at a completely different computing device, which may be geographically separate and/or operated by a different entity. In an embodiment, the chat server, upon receipt of the chat initialization message, determines a chat queue for the new chat. The chat queue may be determined in a variety of ways, including selecting a queue based upon a particular webpage that the user was browsing when launching the chat (e.g., selecting a "television" chat queue when the browser was viewing a merchant page advertising a television), selecting a queue associated with a product or category of products associated with the user-browsed webpage, selecting a queue based upon a "topic" indicated by the user when initiating the chat (e.g., via a user interface input element such as a text box or drop-down menu), etc.

In some embodiments, the chat server comprises a virtual agent (VA) proxy module. In certain embodiments, for a chat including at least an end user and a virtual agent, the VA proxy module intercepts messages received at the chat server from the end user, forwards them to the virtual agent (e.g., via a virtual agent API), and then posts responses from the virtual agents (e.g., received via the virtual agent API) back to be displayed at the chat dialog. Accordingly, the VA proxy module allows virtual agents to be loosely coupled with the chat server, and thus participate in chats just as a live agent would. In some embodiments, the VA proxy module comprises a proxy thread inside the chat server.

In certain embodiments, the chat server updates a chat log of the chat based upon messages received from the end user and messages received from the one or more virtual or live agent representatives. The chat log may include one or more of: the text of each message (i.e., a "transcript" of the chat), metadata for each message (e.g., a date and/or time of the message, a user identifier associated with a message, a network address of the end user or agent), and/or indications of chat events (e.g., a beginning or ending of a chat time/date, an indicator of an escalation of a chat from a virtual agent to a live agent, an indicator of a de-escalation of the chat from a live agent back to a virtual agent, an indicator of an addition or removal of a user/agent to the chat, an indicator of an assignment of the chat to a particular chat queue, an acceptance or denial from an agent of an invitation to participate in the chat, etc.).

According to some embodiments, the chat server is configured to determine whether an "escalation" of the chat—e.g., when a live agent is to be added to a chat—is to occur. For example, an escalation may involve adding a live agent to a chat previously between an end user and a virtual agent. As another example, an escalation may involve adding a different live agent (e.g., a live agent in a supervisor role, for example) to a chat previously between an end user and a first live agent.

Similarly, according to some embodiments the chat server may be configured to determine whether a "de-escalation" of the chat is to occur. A de-escalation may involve adding a virtual agent to a chat previously between an end user and a live agent, and/or may involve adding a different live agent to a chat previously between another live agent and an end user. In various embodiments, the addition of a "new" agent—whether live or virtual—may or may not coincide with a removal of a previous agent.

In some embodiments, a virtual agent is configured to determine that an escalation is required and transmit an escalation indicator to the chat server. The escalation indicator may be sent in a special-purpose message sent by the virtual agent to the chat server, or it may be transmitted within a typical chat message commonly transmitted back to the chat server. In some embodiments, the chat server determines that the escalation is required upon receipt of the escalation indicator from the virtual agent.

In some embodiments, the chat server is configured to determine that an escalation is required based upon an analysis of one or more messages received from the end user and/or virtual agent for a chat. In an embodiment, an administrator (e.g., of a merchant using the chat service provided by the chat server) configures one or more escalation rules indicating conditions when a chat is to be escalated from a virtual agent to a live agent. Thus, if the analysis of the one or more messages triggers one of the escalation rules, the chat server determines that the escalation is required. In some embodiments, the one or more escalation rules are utilized by the virtual agent(s), and a similar analysis occurs on the part of the virtual agent to determine if an escalations is required, and thus, provide the escalation indicator to the chat server.

According to certain embodiments, the one or more escalation rules may be based upon the messages sent by the chat participants and/or the actions (or inactions) of the chat participants. As described above, in some embodiments the escalation rules are processed by the chat server itself, and in some embodiments the escalation rules are processed by the virtual agent, and in further embodiments both the chat server and the virtual agent process certain escalation rules to determine when chat escalation is needed.

As one example, in some embodiments, an escalation rule may be configured such that when a particular number (e.g., two consecutive, or two out of the last three, for example) of messages are received from an end user with a same intent, an escalation is to occur. A "same intent" may be determined based upon same (or similar) results generated an application of natural language processing techniques of the messages, or simply identifying a particular number of repeated words or phrases within the messages. Of course, many other ways to determine commonality between two or more messages are known to those of skill in the art and may be readily derived.

As another example, in some embodiments, an escalation rule may be configured such that when a request from an end user to escalate the chat is received, the rule is triggered and escalation is determined to be required. In some embodiments, the user is presented with a user interface input element (e.g., a button, link, etc.) allowing the user to request an escalation to a live agent by selecting that user interface input element, and in some embodiments if the user asks for a live agent (e.g., asks to speak with a "human" or "real person", etc.) in a chat message, the rule is triggered and escalation is determined to be required.

As another example, in some embodiments, an escalation rule may be configured to cause a chat escalation when a virtual agent is slow to respond (i.e., a "chat event" has occurred where the virtual agent has not responded in a particular period of time) or cannot provide an answer to a particular number of user questions (e.g., one question, two questions, two out of five questions, etc.). As another example, an escalation rule may be configured based upon an inclusion, within a user message (or even an agent message), of a particular word or phrase. For example, a merchant may configure an escalation rule such that anytime a user message includes the word "premium" or "upgrade", or an escalation rule may be configured to be triggered anytime a virtual agent message includes the phrase "I'm sorry" or "I don't understand."

Of course, in certain embodiments the set of escalation rules may be flexibly defined to define many different types of logical conditions, which may be based upon the content of messages, chat events, and external events. As another example of a chat event, an escalation rule may be configured to be triggered when a chat has continued for a particular amount of time (e.g., three minutes, five minutes, etc.). As an example of an external event, in some embodiments one or more live agents may "monitor" a chat—perhaps invisible to the active chat participants—and transmit a message to the chat server indicating a request for the monitoring chat agent to become an active chat participant. The receipt of such a message, by the chat server, may be referred to as an "external event" as it is not directly caused by an action or inaction of an "active" chat participant.

As described previously, in some embodiments a chat server may determine an escalation is to occur from one live agent to another live agent, which may rely upon any of the same configurations presented above with respect to virtual-to-live agent transitions. For example, a live agent may send an escalation indication to the chat server (e.g., indicating a request to add an additional live agent) or the chat server itself may determine that an escalation is to occur, which may be based upon configurable escalation rules.

In various embodiments, the new agent to be added into the chat per an escalation or de-escalation can be selected in a variety of ways. In some embodiments, one or more agents are associated with a particular chat queue of the chat, and one of these agents may be selected according to a configuration, such as selecting one randomly, selecting an agent deemed "available", selecting an agent based upon a "role" of the agent (e.g., a supervisory agent), etc. In some embodiments, the escalating agent (e.g., the virtual agent or live agent) may identify a requested agent to be added and include an identification of this agent as part of the escalation (or de-escalation) identifier it sends to the chat server.

Accordingly, embodiments of the invention provide many advantages. In embodiments providing virtual agent conversational responses within a same chat dialog used for live agent chat, embodiments provide the added, and differentiating, benefit of allowing for the seamless escalation/transfer of a virtual assistant interaction to a live chat agent. Thus, in certain embodiments the end user is able to stay within a same chat dialog throughout the entire service interaction, which provides a better experience for the website visitor by ensuring that all of the information about the visitor, including contextual information from their web session and the entire text transcript of their conversation with the virtual assistant, can be quickly and easily passed to a live chat agent when further assistance is required. By preserving contextual information the consumer can be assured they will not have to repeat information already provided. Thus, embodiments provide seamless transitions from a virtual assistant to a live chat agent via escalation when a virtual assistant cannot resolve an issue, thereby increasing the likelihood that the end user's issue is resolved. Similarly, embodiments provide seamless transitions from a live chat agent back to a virtual assistant, such as when the live chat agent has resolved the end user issue through human interaction, to "wrap up" the chat interaction with common and straightforward business processes.

Accordingly, embodiments of the invention feature a shared message cache maintained at the backend that provides the ability to store and recall all messages of an end user conversation, whether it took place with a virtual assistant, a live chat agent, or both. This common message log may be stored in a variety of ways, such as using a distributed fault-tolerant cache, allowing for conversations to be reconstructed in the event of certain system failures such as a virtual agent "crashing." Thus, embodiments enhance network resiliency, as if any party to a chat suddenly exits (e.g., an end user briefly leaves, a virtual agent goes offline, etc.) the chat may be re-opened and/or a new agent can be easily substituted into an existing chat.

Further, embodiments of the invention provide simple and/or configurable escalation rules to allow the system to recognize when a virtual assistant is unable to satisfy a visitor's question/issue and flexible configuration to define options for continued support. Thus, embodiments enable powerful, configurable escalation paths to be configured via sets of escalation rules.

Embodiments of the invention also provide simplicity of administration and implementation of a chat service due to consistent functionality between providing consumers with a virtual assistant offering and live chat agent offering. For example, embodiments allow an administrator to configure product, category and custom data fields to determine which live agent or virtual agent pool (e.g., which chat queues) to assign to the chat interaction. Additionally, embodiments provide simultaneous insight into both virtual and live agent performance by enabling data for real-time dashboards and/or historical reporting to thereby monitor and audit the outcomes of the chat representatives.

Moreover, embodiments of the invention provide a modular chat server that can generically operate using different virtual agent or live agent entities. Thus, through use of the virtual agent proxy module, one or more different virtual agents may seamlessly be used in a same chat system, and chats may even seamlessly be shifted from one type of virtual agent to another type of virtual agent. Additionally, embodiments provide a chat system with tremendous scalability, as the increased processing (e.g., computational, network, storage, etc.) load placed upon the chat server and/or virtual agent proxy when adding additional agents is negligible, no matter whether the added agents are virtual or live.

Thus, embodiments of the invention provide a chat service that covers contact center service gaps, qualifies the end-user into chat channels and shortens handling time—by, for example, shifting the bulk of the data collection tasks normally reserved for a live agent to the responsibility of a virtual agent. Further, embodiments allow for multiple "personas" or roles to be utilized, such as a live agent, a supervisor (e.g., performing workforce management tasks such as monitoring live agent performance), coaching supervisors (e.g., monitoring real-time chat performance dashboards, silently observe existing chats, or visibly join existing chats), etc.

While certain embodiments are disclosed describing how the improved real-time chat server utilizing a virtual agent proxy can be used as part of a chat dialog within webpages of a merchant, this is not intended to be restrictive. In addition to webpages of merchants, the system may be utilized with other types of websites (e.g., not associated with a merchant) or other types of applications (e.g., special-purpose "apps"), and thus the teachings disclosed herein can also be applied to other types of software-based applications and environments. Thus, the teachings are applicable to any application that may benefit from utilizing virtual agents in a real-time or substantially real-time chat usage scenario.

I. Exemplary Real-Time Chat Service Systems

FIG. 1 illustrates a simplified high level block diagram and conceptual overview of an improved real-time chat service system 100 utilizing a virtual agent proxy (e.g., virtual agent proxy module 108) according to some embodiments of the present invention. As illustrated, the improved real-time chat service system 100 presents a network environment comprising a client device 104 (utilized by end user 106) that is communicatively coupled via one or more communication networks 110 to a chat server 102. The chat server 102 provides real-time chat functionalities by routing communications between the end user 106, one or more live agents 116A-116J (via non-illustrated computing devices), a supervisor live agent 116K (via a non-illustrated computing device), and/or one or more virtual agents 114A-114N, which may be software modules executing at one or more computing devices. However, the embodiment depicted in FIG. 1 is merely one example and is not intended to unduly limit the claimed embodiments of the present invention. Thus, one of ordinary skill in the art would recognize many possible variations, alternatives, and modifications to this illustrated system 100. For example, there may be more or fewer user computing devices and/or servers than shown in FIG. 1.

The client device 104, and other computing devices used in this system (e.g., computing devices used by live agents 116A-116K and/or implementing virtual agents 114A-114N and/or merchant server 112), may be of various different types including, but not limited to, personal computers (PCs), desktops, mobile or handheld devices such as laptops, mobile phones, tablets, etc., and other types of devices. The communication networks 110 facilitate communications between the client device 104 and chat server 102, and may also facilitate communications between the chat server 102 and the live agents 116A-116K, virtual agents 114A-114N, and/or merchant server 112. The one or more communication networks 110 can include networks of various types, each possibly including one or more networking devices or equipment including but not limited to network switches, routers, bridges, load balancers, etc. Examples of one or more communication networks 110 include, without restriction, the Internet, a wide area network (WAN), a local area network (LAN), an Ethernet network, a public or private network, a wired network, a wireless network, a virtual network, etc., and combinations thereof. Different communication protocols may be used to facilitate the communications through the one or more communication networks 110 including both wired and wireless protocols such as the IEEE (Institute of Electrical and Electronics Engineers) 802 suite of protocols, Internet Protocol (IP), TCP/IP (Transmission Control Protocol/Internet Protocol), Asynchronous Transport Mode (ATM), frame relay network protocols, Multi-Protocol Label Switching (MPLS), OpenFlow, IPX (Internetwork Packet Exchange), SAN (Storage Area Network) protocols, AppleTalk, Bluetooth, Long-Term Evolution (LTE), and other protocols. In general, communication networks 110 may include any communication network or infrastructure that facilitates communications between clients (e.g., client device 104, live agents 116A-116J, virtual agents 114A-114N, etc.) and chat server 102.

In some embodiments, user 106 may browse a website of a merchant, for example, provided by merchant server 112 by requesting resources, such as webpages, using a client device 104. In certain embodiments, the request for a resource may result from the user 106 utilizing an application 105 executed by the client device 104. An example of such a program is a web browser, which may be used to generate webpage requests and display received webpages in response to the requests. A webpage typically comprises one or more types of code, including but not limited to HTML (HyperText Markup Language) code, CSS (Cascading Style Sheets) code, JavaScript code, etc., for instructing the browser how to present the webpage to the user 106. The webpage itself may include additional URLs of additional resources (e.g., images, additional code, video), which are also retrieved by the browser. When the browser has retrieved all necessary resources, it "outputs" the webpage by rendering some or all of the webpage, and displaying it via a display. Examples of browsers include without restriction various versions of Internet Explorer (IE) by Microsoft™, Safari by Apple™, Chrome by Google™, Firefox by Mozilla™, Opera by Opera Software ASA, and others. Although this example is presented with detail regarding browsers and webpages, in some embodiments the improved real-time chat system may be utilized in other software applications including but not limited to operating system software, social networking software, productivity software, etc. Once a webpage has been received and output by the application 105 (e.g., browser) on client device 104, the user 106 of the device 104 may interact with the webpage in various ways using one or more input mechanisms provided by the user computing device. These input mechanisms may include a mouse, a keyboard, touch-based input mechanism (e.g., a touch-enabled display, a touchpad), audio inputs (e.g., a microphone), video inputs (e.g., a camera), and the like.

The end user 106, through the application 105, may be placed into a real-time chat via chat server 102. In some embodiments, a set of chat queues are maintained by the chat server 102 that may be designated as either live agent queues or virtual assistant queues, and a set of agent accounts may be designated as virtual agent or live agent accounts.

Chat queues, when used with a set of profiles and business rule configurations, enable the automated sorting of incoming chats based on contact, organization, product, category, and/or custom field information. For example, a wireless communications organization may use live (or virtual) agents that specialize in different types of sales products or services. For example, one chat queue may be designated for chats involving cell phones, and another chat queue may be associated for chats involving wireless service plans. In some embodiments, profiles may be created that assign virtual and/or live agents to the different queues. Thus, in some embodiments when a user/chat is placed into a live agent chat queue, one or more live agents associated with that chat queue may be notified of the initiation of the chat (or invited to be the representative for the chat). In some embodiments, a notified/invited live agent may indicate their intention to enter the chat, though in some embodiments a chat may simply be assigned to one of the live agents via an assignment process (e.g., a round-robin selection, a modified round-robin selection based upon live agent availability or workload, a random selection, etc.). In some embodiments, when a user/chat is placed into a virtual agent queue by the chat server 102, the virtual agent proxy module 108 detects this placement, selects and assigns a virtual agent to the chat, records this mapping, and may transmit a message to the virtual agent to indicate that it is now part of the chat.

Thus, the virtual agent proxy module 108 allows for chats to flexibly include one or more virtual agents 114A-114N and/or one or more live agents 116A0116K. The virtual agent proxy module (VAPM) 108, in some embodiments, intercepts messages received at the chat server 102 that are bound for chats assigned to a virtual agent, transmits these messages to the assigned virtual agent, receives messages from the virtual agent, and causes these messages to be sent back to the client device 104 of the end user 106. In some embodiments, the VAPM 108 maintains a map of those chat queues serviced by virtual agents, tracks virtual agent sessions for recording/reporting agent events in a set of system statistics, reads site configuration values to identify which agents are virtual and which chat queues are serviced by virtual agents, and/or processes escalation rules and assigns chats requiring escalation to an appropriate live agent chat queue. Further detail describing the architecture and functionality of the virtual agent proxy module 108 and the chat server 102 is now described further with respect to FIG. 2.

Figure 2:
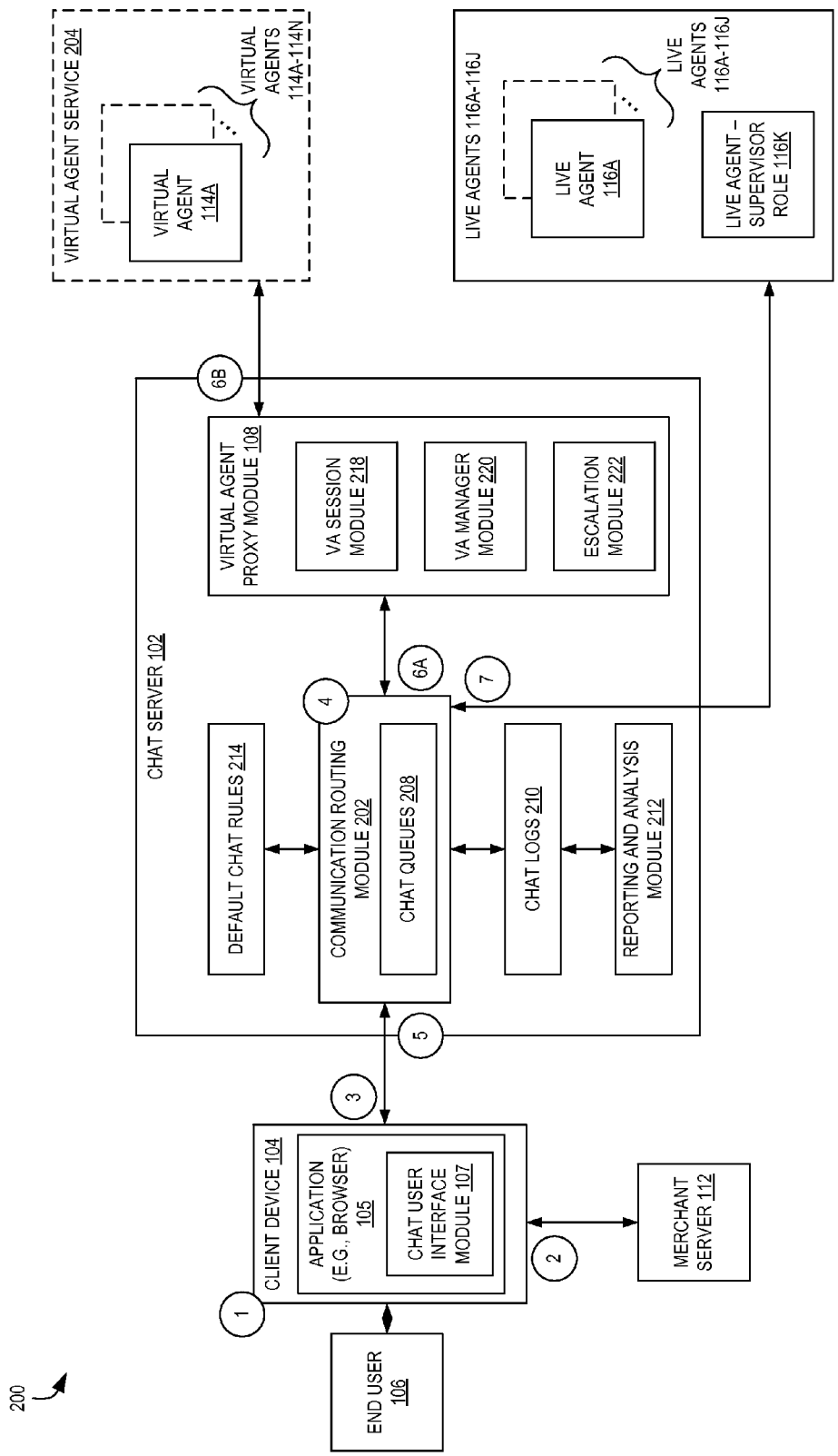
FIG. 2 illustrates components of a chat server including a virtual agent proxy module used in a system for providing an improved real-time chat service according to some embodiments of the present invention.

FIG. 2 illustrates detailed components of a chat server 102 including a virtual agent proxy module 108 used in a system 200 for providing an improved real-time chat service according to some embodiments of the present invention.

In some embodiments, an end user 106 may cause an initiation of a chat when browsing a website provided by a merchant server 112. For example, at circle '1', the end user 106 may execute a web browser application 105 at their client device 104 and navigate to a website of the merchant. Thus, the client device 104 at circle '2' transmits a request for a resource of the website (e.g., an HTTP GET or POST request for a webpage hosted by merchant server 112) to the merchant server 112, which responds with the webpage. The webpage, in some embodiments, automatically initiates a chat as it is rendered by the application 105, but in some embodiments the user causes the chat to be initiated, such as by selecting a user input element (e.g., clicking a link, clicking a button or image, etc.). Of course, in other embodiments the chat may occur via another type of application 105 (i.e., a non-browser application) such as a special-purpose application, a merchant application, a social networking application, etc.

In some embodiments, the initiation of the chat comprises the client device 104 transmitting a chat initiation message, at circle '3', to the chat server 102. The chat server 102 may be executed by a same set of computing resources as that of the merchant server 112, or may be executed by a completely separate set of computing resources, which may be geographically separate than a server computer implementing the merchant server 112. In some embodiments, the chat initiation message comprises an HTTP message transmitted to the chat server 102, and may include information (e.g., via field-value parameters of an HTTP GET query string, for example) providing context allowing the chat server 102 to determine which chat queue the resulting chat is to be placed into. For example, the chat initiation message may include information that identifies the end user 106, identifies the webpage or module causing the chat initiation message to be transmitted (e.g., a URL or identifier of a webpage), identifies a category/product/etc. of that webpage, etc.

Upon receipt of the chat initiation message, at circle '4' the communication routing module 202 of the chat server 102 assigns the user/chat to a chat queue 206. As described above, the chat server 102 in some embodiments maintains a set of chat queues 206 that are designated as live agent queues or virtual agent queues, and may be further associated with a particular contact, organization, product, category, etc. Thus, in some embodiments the communication routing module 202 selects a chat queue based upon the identifying information of the chat initiation message and a set of default chat rules 214 configured for the chat server 102. For example, in some embodiments the identifying information includes a "product category" value of a product category (e.g., "cellular phones") associated with the webpage the end user 106 was browsing when the chat was initialized, and the communication routing module 202 may identify the product category value from the message, and use this value as an index into a set of default chat rules 214 mapping product category values to chat queues to identify the particular chat queue. Of course, many other configurations for the default chat rules 214 are possible and recognizable to those of skill in the art for mapping initiated chats to chat queues, and thus the presented example regarding "product categories" is to be viewed as illustrative and not limiting. For example, a few other configurations include mapping chats to chat queues based upon one or more of determining which merchant's website launched the chat, a data element explicitly provided by the end user 106 when initiating the chat (e.g., a value selected/provided by the end user 106 indicating a topic for the chat), a queue size (e.g., currently available slots, total queue size, etc.), an estimated wait time of the queues, etc.

If the chat is assigned to a chat queue 206 designated as a live agent queue, the chat server 102 may notify, invite, and/or assign one of the live agents 116A-116K to the chat. In some embodiments, if no live agents 116A-116K are available, the end user 106 may be notified that all agents are busy and/or be presented an estimated wait time, and in some embodiments, the chat may be "de-escalated" and assigned to a virtual agent (e.g., VA 114A) as the regular representative or as a temporary representative until a live agent is available. This can reduce end user 106 frustration as they are not simply idling while waiting for a live agent, and the virtual agent 114A may instead begin a process of collecting information from the end user 106 or attempt to assist in other ways. Further details related to chat de-escalation processes will be presented in further detail later herein.

For illustration purposes, we continue by assuming that the chat is assigned to a chat queue 206 at circle '4' designated as a virtual agent queue. In some embodiments, at circle '5' a chat initiation response message is transmitted back to the client device 104 to indicate a beginning of the chat. At this point (or before this point, such as at or before circle '3') the application 105 may cause a chat user interface module 107 to be presented to the end user 106, which allows for the chat to proceed by providing user input elements for the end user 106 to input text (e.g., ask questions) and view responses made by the assigned representative(s). Further detail involving the chat user interface module 107 according to one embodiment of the invention is presented below with respect to FIG. 3.

At circle '6A'—which may occur before or after circle '5' and the chat initiation response message, the virtual agent proxy module 108 may detect the assignment of the chat to a virtual agent chat queue 208. For example, in the depicted embodiment, the virtual agent proxy module 108 includes a virtual agent manager module 220 that maintains a mapping of chat queues designated as virtual agent queues, and monitors the chat queues 208. Upon an assignment by the communication routing module 202 of the chat to a virtual agent queue, the virtual agent manager module 220 selects/assigns a virtual agent (in configurations with multiple virtual agents) to the chat, instructs the virtual agent session module 218 to create a chat session for that chat for that virtual agent, updates a mapping between the selected virtual agent and the chat session to indicate the assignment, and transmits a message to the virtual agent (e.g., VA 114A) at circle '6B' to indicate that the chat session has begun. In some embodiments, one or more of the virtual agents 114A-114N are provided as part of a virtual agent service 204, and thus the message sent at circle '6B' may be transmitted to a server computer of the virtual agent service 204.

In some embodiments, circle '6B' may not occur until after a first chat message is received from the end user 106 for the chat. For example, in some embodiments the chat user interface module 107 is presented to the end user 106 at or before circle '3' (where the chat initiation message is transmitted), and thus the end user 106 may enter a message (e.g., a question) and cause it to be transmitted to the chat server 102. The chat message may then be "intercepted" by the virtual agent proxy module 108, and sent to the assigned virtual agent 114A as a first message (of any kind) for that chat sent to the assigned virtual agent 114A at circle '6B'.

However, in some embodiments, circle '6B' informs the assigned virtual agent 114A of the initiation of the chat. At this point, either the end user 106 or the assigned virtual agent 114A may begin participating in the chat by composing and transmitting a message to the other party via chat server 102 (and virtual agent proxy module 108). For example, the end user 106 may compose a message by providing user input (e.g., via a keyboard, mouse, touchscreen, microphone, or other user input device) to the client device 104 via chat user interface module 107, which causes the client device 104 to transmit the message to the chat server 102. Upon receipt of the message, the communication routing module 202 will update a chat log 210 for that chat based upon the message. The virtual agent proxy module 108, in communication with the communication routing module 202, will "intercept" the chat message, determine which virtual agent is the assigned virtual agent for the chat (e.g., based upon mappings maintained by the VA manager module 220 and/or VA session module 218), and transmit the chat message to that assigned virtual agent 114A.

Similarly, the assigned virtual agent 114A may participate in the chat by composing a message according to known virtual agent techniques (e.g., based upon configured chat rules, based upon an analysis of one or more messages received from the end user 106, etc.). With a composed message, the assigned virtual agent 114A transmits a message including the composed message back to the chat server 102, which is routed via the virtual agent proxy module 108 to the communication routing module 202. The communication routing module 202 updates the chat log 210 for that chat accordingly, and transmits the composed message back to the client device 104 to be presented/displayed to the end user 106.

In some situations, the assigned virtual agent 114A may be able to completely satisfy the end user's 106 needs and thus, one or both sides of the chat (i.e., one or both of the end user 106 and the assigned virtual agent 114A) may transmit a message to the chat server 102 to indicate a chat termination, causing the chat server 102 to update its chat logs 210, remove the chat from its active chat records (e.g., from the chat queue 206, from mappings maintained by the virtual agent proxy module 108, etc.), etc., and end the chat according to known techniques.

However, in some situations the assigned virtual agent 114A may be unable to satisfy the end user's 106 needs. In this situation, a chat "escalation" may be triggered by one or more of the end user 106, the virtual agent 114A, and chat server 102 acting together or independently. An escalation may include adding a live agent to a chat previously handled by a virtual agent, or adding another live agent (e.g., a live agent in a supervisory role 116K) to a chat previously handled by a different live agent. Similarly, a "de-escalation" may similarly be triggered by one or more of the end user 106, a live agent (e.g. live agent 116A), and chat server 102. In either case, in various embodiments the existing agent may or may not be removed from the chat when the "new" agent is added.

As described earlier, the chat server 102 determines whether an escalation or de-escalation of the chat is to occur. In some embodiments, a virtual agent determines that an escalation is required and transmits an escalation indicator to the chat server. In some embodiments, the chat server 102 determines that an escalation or de-escalation is required based upon an analysis of one or more messages received from the end user and/or virtual agent and/or live agent for a chat. In some embodiments, a live agent determines that an escalation or de-escalation is to occur and transmits an escalation indicator (or a de-escalation indicator) to the chat server.

Continuing the example indicated by the circles, the chat server 102 (e.g., the escalation module 222 of the virtual agent proxy module 108) at some point determines that an escalation is required from the assigned virtual agent 114A to a live agent. For example, the virtual agent proxy module 108 may receive an escalation indicator from the assigned virtual agent 114A which is observed by the escalation module 222. In turn, the escalation module 222 causes the VA session module 218 and/or the VA manager module 220 to update their agent-to-session mappings to reflect a removal of the assigned virtual agent 114A from the chat, and instructs the communication routing module 202 to place the chat into a separate chat queue assigned to live agents and update the chat log 210 accordingly. Thus, at circle '7', the communication routing module 202 may assign a live agent (e.g., live agent 116A) to the chat via processes described above.

As described herein, throughout a chat, the communication routing module 202 causes a chat log 210 to be updated to reflect the activities of the chat. The chat log 210 may then be updated to include the text/content of the messages sent between the end user 106 and the representative(s) (i.e., agents) participating in the chats. The chat log 210 may also include chat metadata including event indicators describing chat events and other descriptive information including, but not limited to, details of the initiation or termination of the chat, the chat queue(s) that the chat is assigned to, the live and/or virtual agents assigned to the chat, dates/times associated with the messages/events, a partial browsing history (e.g., page titles, URLs, etc.) of the end user 106, etc. These chat logs 210 for the chats may be stored at a same server computing device implementing the chat server 102, or, may be stored remote to the chat server 102 (e.g., using a cloud-based storage service) to potentially create distributed copies of the chat logs 210.

In some embodiments, when a live agent 116A is added to a chat, the computing device (not illustrated) of the live agent is provided with some or all of the chat log 210 for the chat, such that the live agent 116A has a full view of the history of the chat.

In some embodiments, the chat server 102 further comprises a reporting and analysis module 212. The reporting and analysis module 212 may utilize the chat logs 210 and a set of algorithms configured to analyze the events of the hosted chats and report findings to human users (e.g., a live agent in a supervisor role 116K). Accordingly, the reporting and analysis module 212 may be configured with algorithms to, for example, determine statistical indicators quantifying the chat time of chats (e.g., an average chat time, maximum chat time, minimum chat time, etc.) on a per-agent, per-queue, or other basis, determine a statistical indicator quantifying the numbers of messages sent by the end users 106 and/or agents, etc. The reporting and analysis module 212 may be configured to provide access to these statistical indicators via a variety of formats, such as through a web-based or application-based "dashboard" (which can be real-time, substantially real-time, or more cumulative), via email or SMS, or via generated reports (e.g., spreadsheet documents, etc.).

In some embodiments, the reporting and analysis module 212 may be configured to "monitor" chats via watching the chat logs 210. For example, the reporting and analysis module 212 may be configured with a variety of "trigger" words or phrases (or events) to watch for in a chat, and upon an occurrence of the trigger (e.g., a user asking a same question twice, a user mentioning a particular product or service, an agent failing to respond to user question in a period of time, an agent using a prohibited word, etc.) notify one or more configured live agents (e.g., supervisory live agents 116K) and/or automatically cause the chat server 102 to perform an immediate escalation or de-escalation of the chat.

II. Chat User Interface Module

Figure 3:
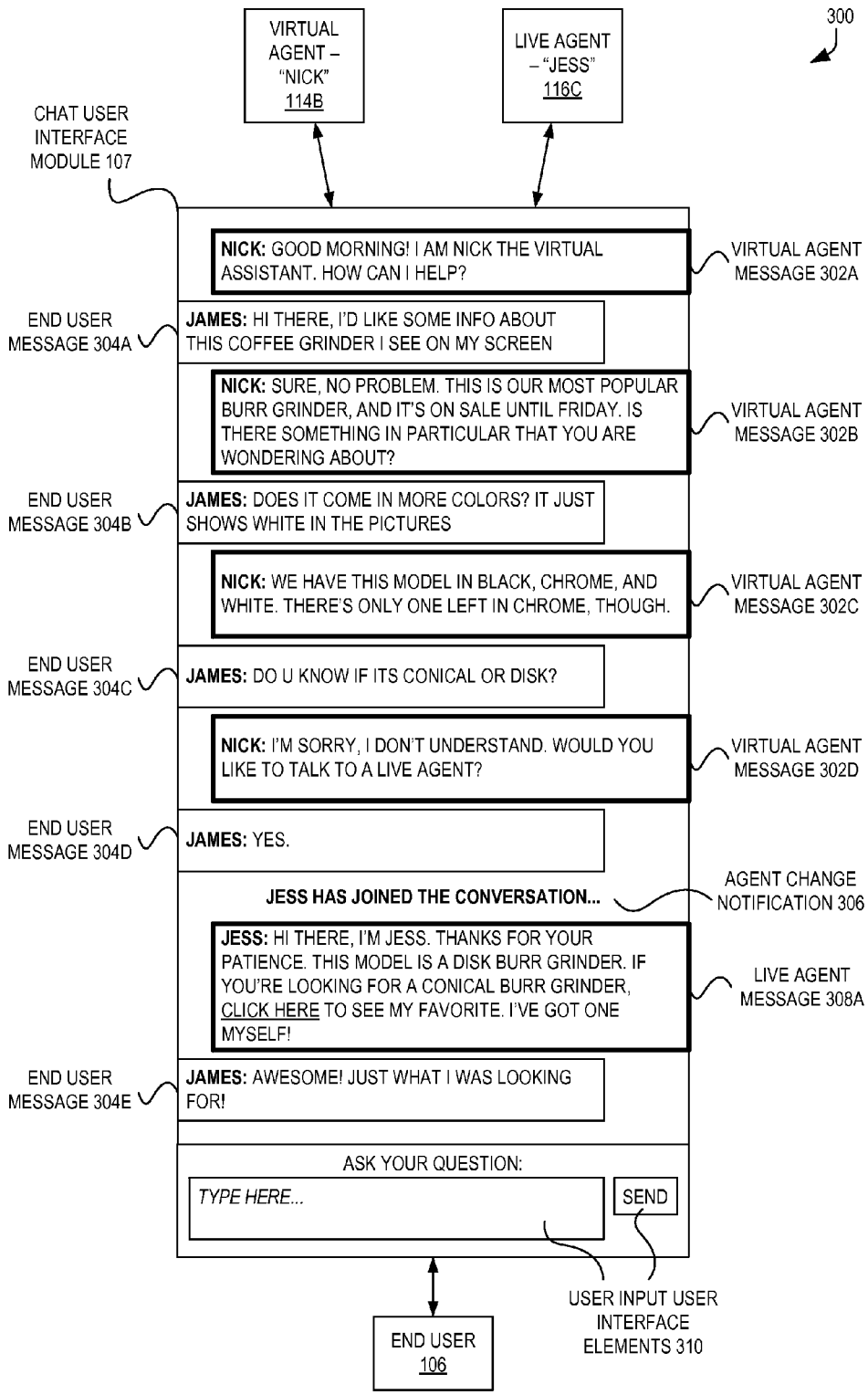
FIG. 3 illustrates a chat user interface module used by an end user for a chat including a seamless virtual agent to live agent escalation according to some embodiments of the present invention.

Having presented the "backend" of the chat provided by the virtual agent proxy module 108 of the chat server 102 in combination with the virtual agents 114A-114N and live agents 116A-116K, we now turn to the chat from the perspective of the end user 106. FIG. 3 illustrates a view 300 of a chat user interface module 107 used by an end user 106 for a chat including a seamless virtual agent to live agent escalation according to some embodiments of the present invention.

In some embodiments, the chat user interface module 107 is presented to the user via a website of a merchant. For example, a webpage received from the merchant server 112 may present the chat user interface module 107 or otherwise allow the end user 106 to launch the chat user interface module 107 (e.g., via selecting a link, button, etc.). The chat user interface module 107 may comprise a chat window or overlay and be implemented using a variety of software modules allowing for interactivity between the end user 106 and the chat server 102, including but not limited to JavaScript (e.g., jQuery), Flash, HTML5, Java, etc. Code and/or data used to generate the chat user interface module 107 may have been provided by the merchant server 112, from the chat server 102 itself, or another third party server. The depicted chat user interface module 107 also includes two user input user interface (UI) elements 310—a text input box (e.g., an HTML <textarea> element or HTML <input> element of type "text") here illustrated with placeholder text ("TYPE HERE . . . ") and a submit button ("SEND", which can be an HTML <input> element of type "submit", or another element configured to cause a submission of the message provided in the text input box, perhaps using JavaScript). Thus, to participate in the chat, the end user 106 causes message text to be entered into the text input box and causes the submit button to be selected, which causes a message to be sent to the chat server 102 that includes the entered message text, which, in turn, causes the chat server 102 to update a chat log and route the message to the assigned agent. Similarly, an assigned agent may participate in the chat by sending a message to the end user's client device via the chat server. The message content of that message will then be presented to the end user 106 within the chat user interface module 107.

In various embodiments, the chat user interface module 107 is presented before, concurrent with, or after the client device 104 transmits the chat initialization message to the chat server 102 to begin a chat. In this illustrated example, the chat is initiated for the end user 106 with one representative—a virtual agent 114B referred to as "Nick." In this example, the virtual agent 114B begins the chat with a first virtual agent message 302A asking the end user 106 a question. The end user 106—here deemed "James"—responds with a question of his own in end user message 304A.

In this case, the virtual agent 114B is able to parse the end user message 304A, determine the intent of the end user message 304A, and compose an appropriate response as virtual agent message 302B. Similarly, the end user 106 again asks a question via end user message 304B, and the virtual agent 114B again determines the intent of the user message 304B and provides an appropriate response as virtual agent message 302C.

However, the end user 106 then sends end user message 304, which includes a question—seeking an indication of whether a particular coffee grinder is a "conical" or "disk" grinder—that the virtual agent 114B is unable to properly answer. Depending upon the particular configuration or implementation of the chat system, the flow may continue in a variety of ways. In this example, we assume that the system is configured with escalation rules such that if the virtual agent 114B is unable to even once determine the intent of a user question (and thus cannot respond with a likely helpful answer), the virtual agent 114B is to respond by asking the end user 106 if an escalation is sought (e.g., virtual agent message 302D, which asks "Would you like to talk to a live agent?"), and if the user indicates a desire to escalate the chat (as is done by end user message 304D), then the chat will in fact be escalated.

Accordingly, in some embodiments, the virtual agent 114B is configured to await a response to the escalation query message (i.e., virtual agent message 302D), and when the response indicates a user desire for the escalation, send an escalation indicator to the chat server 102 to escalate the chat. However, in some embodiments, the chat server 102 itself may be configured to detect that the escalation is to occur. For example, the chat server 102 may be configured to identify the escalation query message (virtual agent message 302D), and upon detecting an affirmative response (end user message 304D), cause the escalation to occur without any instruction from the virtual agent 114B.

Thus, having determined that an escalation is to occur, the chat server 102 enacts the escalation by, for example, placing the chat into a chat queue assigned to live agents, and receiving an indication that a live agent 116C named "Jess" will enter the chat. At this point, the chat server 102 will update the chat log accordingly to identify the escalation and the addition of the live agent 116C to the chat, and notify the end user 106 that "Jess has joined the conversation" via an agent change notification 306 message. Similarly, the entire chat transcript—including virtual agent messages 302A-302D and also end user messages 304A-304D) will be provided to the live agent 116C to allow the live agent 116C to quickly understand what has been discussed in the chat up until that point in time.

In the depicted embodiment, the live agent 116C transmits a first live agent message 308A via the chat server 102 to the end user 106 client device, which includes an introduction as well as information responsive to the end user's 106 previous message 304C that the virtual agent 114B was unable to answer. This live agent message 308A also includes a link (e.g., a hyperlink/HTML <a> element) to another webpage that the end user 106 can select. Finally, the end user 106 sends end user message 304E, indicating that the addition of the live agent 116C to the chat was helpful.

In some embodiments, the end user 106 may select an "end chat" user interface element (not illustrated) allowing the chat to be terminated, and/or the live agent 116C may cause the chat to be terminated, escalated (e.g., sent to a supervisor live agent), and/or de-escalated (e.g., sent back to virtual agent 114B).

III. Exemplary Chat Message Sequencing

Figure 4:
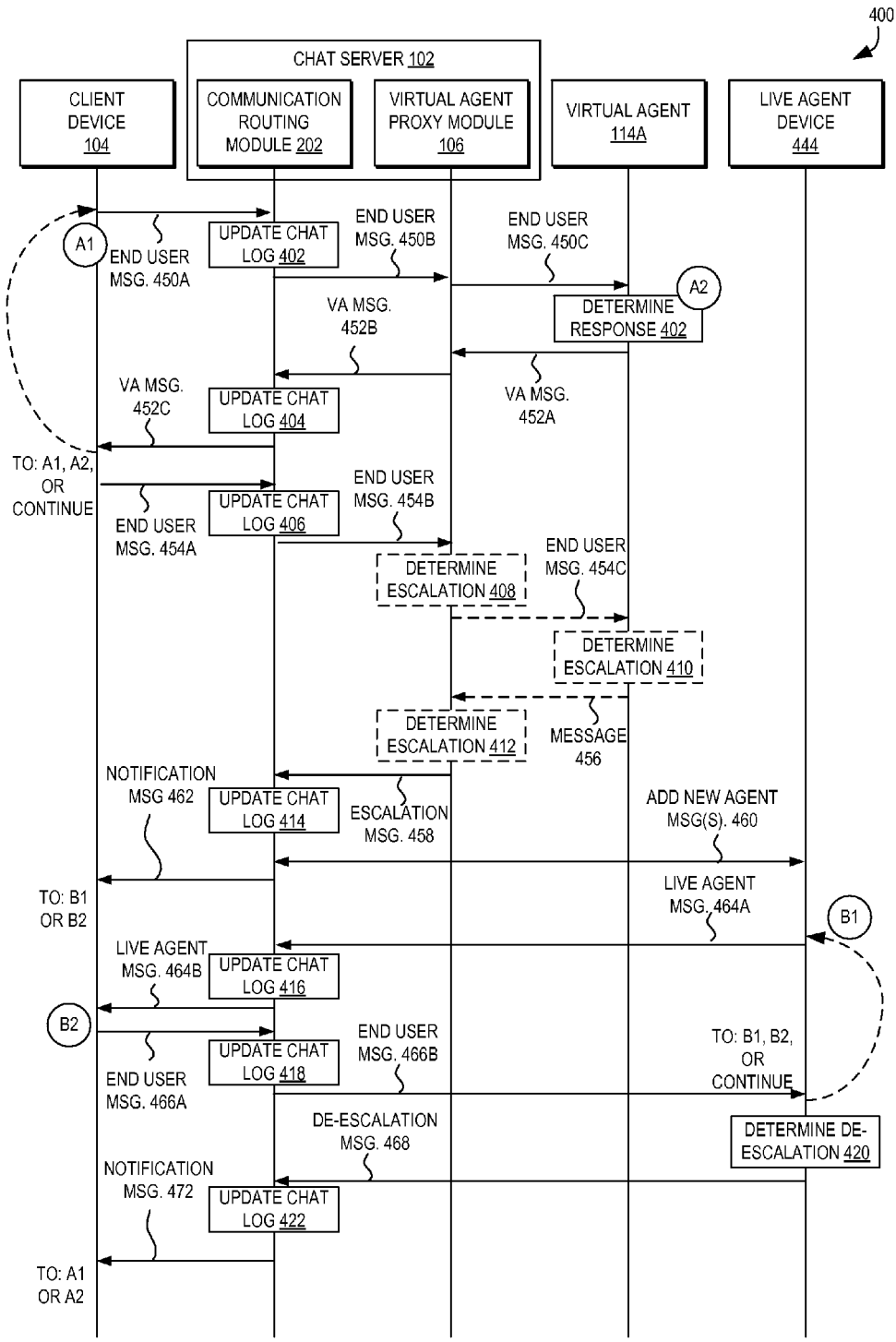
FIG. 4 illustrates a sequence diagram depicting messaging between components of an improved real-time chat service according to some embodiments of the present invention.

FIG. 4 illustrates a sequence diagram 400 depicting messaging between components of an improved real-time chat service according to some embodiments of the present invention. This diagram 400 illustrates some messaging and escalation and de-escalation paths that may occur in some embodiments, and does not illustrate chat initializations or terminations. Based upon the surrounding descriptions of chat initialization and termination, the operations of those non-illustrated flows may be readily determined by those of skill in the art.

Thus, in this depicted embodiment, a chat is already underway between an end user (using client device 104) and virtual agent 114A. Thus, at circle 'A1', the client device 104 transmits an end user message 450A carrying a message composed by the end user, which is received by the communication routing module 202 of the chat server 102.

Based upon this message 450A, the communication routing module 202 updates the chat log 402 of the chat (e.g., saves a user identifier, a date/time value of the message, the composed message itself, etc.) and, based upon determining that the chat is associated with a live agent (e.g., using its stored chat session mappings and/or data from the message), passes the end user message 450B to the virtual agent proxy module 108. The virtual agent proxy module 108, then, determines which virtual agent the message is to be sent to and transmits the end user message 450C to the virtual agent 114A.

Although end user messages 450A-450C will, in an embodiment, have a commonality as they each transmit the message composed by the end user 106, these messages may be transmitted between the entities differently and may be of different type. For example, in some embodiments end user messages 450A and 450C may be transmitted using packets across one or more networks 110, and end user message 450B may be transmitted using a form of inter-process communication (e.g., using shared memory, function calls and/or remote procedure calls, etc.), as one example.

At circle 'A2', the virtual agent 114A determines 402 a response. In some embodiments, the virtual agent 114A parses the end user message 450C to utilize natural language processing techniques and thereby understand the user message and generate an appropriate response, which may include consulting a set of chat configuration rules and/or generalized or specialized (e.g., merchant-specific) knowledge databases.

Then, the virtual agent 114A transmits a generated response as VA message 452A to the virtual agent proxy module 108, which sends the VA message 452B to the communication routing module 202. The communication routing module 202 updates the chat log 404 accordingly and sends the VA message 452C on to the client device 104 to be presented to the end user. At this point, the chat may continue at circles 'A1' or 'A2'—thus, either the end user or the virtual agent 114A may cause a next message to be sent for the chat.

In this depiction, the flow continues with another end user message 454A being sent from the client device 104 to the communication routing module 202, the chat log being updated 406, and the end user message 454B being sent on to the virtual agent proxy module 108.

In this example, the chat server 102 will determine that an escalation is to occur.

As described above, in some embodiments an administrator (e.g., of a merchant using the chat service provided by the chat server 102) configures or otherwise enables one or more escalation rules indicating conditions when a chat is to be escalated from a virtual agent to a live agent. Thus, the chat server 102 may utilize the escalation rules, and if the analysis of chat messages triggers one of the escalation rules, the chat server determines that the escalation is required. In some embodiments, though, the one or more escalation rules are utilized by the virtual agent(s), and a similar analysis occurs on the part of the virtual agent to determine if an escalations is required, and thus, provide the escalation indicator to the chat server.

As one possible scenario, the virtual agent proxy module 108 may determine, at block 408, that an escalation is to occur based upon the end user message 454B. For example, the message 454B may cause an escalation rule to be triggered. The escalation rule may be configured such that if an end user message 454B includes a particular word or phrase, the chat is to be escalated. Additionally, an escalation rule may be configured such that if the end user message 454B is a repeat of an earlier end user message (e.g., end user message 450B), the chat is to be escalated. Of course, many other escalation rules may be implemented based upon the preference of the implementing party.

As an alternative, the virtual agent proxy module 108 may forward on the end user message 454C per normal functioning, and the virtual agent 114A instead may make a determination that the chat is to be escalated at block 410. For example, an escalation rule may be configured such that if the virtual agent 114A is either unable to determine an intent of the end user message 454C or determine an appropriate response, the chat is to be escalated. Additionally, an escalation rule may be configured such that if the virtual agent 114A determines that an intent of the end user message 454C is the same as a determined intent of an earlier message, the chat is to be escalated. Of course, many other escalation rules may be configured for use by the virtual agent 114A to determine whether an escalation is to occur, and thus these examples are merely illustrative. In some embodiments, upon making the determination 410, the virtual agent 114A transmits a message 456 back to the virtual agent proxy module 108 that includes an escalation indicator to cause the chat server 102 to escalate the chat. The message 456 may, in some but not all configurations, also include a message to be sent back to the client device 104.

As another alternative, assuming that neither block 408 nor block 410 is performed, the virtual agent 114A may return a message 456 that comprises a "normal" chat message (e.g., VA message 452A) including a message for the end user 106. Based upon this message 456, and possibly other messages such as end user message 454C and/or other, earlier messages, the virtual agent proxy module 108 may determine that the chat is to be escalated at block 412. As an example, virtual agent proxy module 108 may be configured to utilize an escalation rule configured to identify "non-responsive" messages (e.g., message 456) sent by the virtual agent 114A, which may include a particular phrase or match a pattern. Thus, in some embodiments the virtual agent 114A need not be configured to perform escalations whatsoever, and thus the system may utilize any number of different, possibly heterogeneous virtual agents 114A-114N that may be "off-the-shelf" virtual agent implementations.

Of course, many other types of escalation rules may be flexibly configured based upon the particular preferences of the implementing entity. For example, an escalation rule may be configured such that when a particular number (e.g., two consecutive, or two out of the last three, for example) of messages are received from an end user with a same intent, an escalation is to occur. As another example, an escalation rule may be configured such that when a request from an end user to escalate the chat is received, the rule is triggered and escalation is determined to be required. As another example, an escalation rule may be configured to cause a chat escalation when a virtual agent is slow to respond (i.e., a "chat event" has occurred where the virtual agent has not responded to a user message in a particular period of time) or cannot provide an answer to a particular number of user questions (e.g., one question, two questions, two out of five questions, etc.). As another example, an escalation rule may be configured based upon an inclusion, within a user message (or even an agent message), of a particular word or phrase. As another example an escalation rule may be configured to be triggered when a chat has continued for a particular amount of time (e.g., three minutes, five minutes, etc.).

Regardless of whether the escalation was determined at block 408, 410, or 412, the virtual agent proxy module 108 will send an escalation message 458 to the communication routing module 202 to inform it of the escalation, and it will update the chat log 414 accordingly. The virtual agent proxy module 108 may also cause the chat to be switched into a different chat queue serviced by live agents.

In this depicted embodiment, the communication routing module 202 interacts with one or more live agents to add a live agent (here, live agent 116A) to the chat, as described above, which may include transmitting and receiving one or more messages 460 required for adding an agent to the chat. The live agent 116A, in being added to the chat, is thus provided with a full transcript (via the chat log) of the end user messages and virtual agent messages up until that point. As (or after) the live agent 116A is being added to the chat, the communication routing module 202 may transmit a notification message 462 to the client device 104 indicating that the live agent 116A is joining the chat, that the virtual agent 114A is exiting the chat, and/or that a live agent will join the chat soon.

At this point, the flow will continue at circles 'B1' or 'B2'. For purposes of explanation, we assume the flow continues at circle 'B1', where the newly-added live agent 116A composes and transmits a message 464A (using live agent device 444) to the communication routing module 202, which updates the chat log 416 and sends the message 464B to the client device 104, which presents the message 464B to the end user. The end user may then compose another message 466A, which is sent to the communication routing module 202 of the chat server 102. The communication routing module 202 updates the chat log at block 418, and sends the end user message 466B on to the live agent device 444. This process may continue back at circle 'B1' (where the live agent 116A will compose another message), circle 'B2' (where the end user will compose another message), or continue.

For purposes of illustration, we assume the flow continues, and at block 420, the live agent 116A determines that a de-escalation is to be performed. In some embodiments, the live agent 116A may enter a command or select a user interface element (via live agent device 444) indicating that the chat is to be de-escalated. This may, in some situations, occur when the live agent 116A has fully assisted the end user, and then seeks to return the chat back to a virtual agent for further straightforward communications to occur. For example, a de-escalation to a virtual agent may be performed to allow a virtual agent to gather information from the user (e.g., name, address, phone number, financial information, account numbers, etc.) or communicate standard information to the user (e.g., display terms and conditions, communicate instructions, etc.). Thus, a de-escalation message 468 is sent by the live agent device 444 to the communication routing module 202 of the chat server 102. The communication routing module 202 may then perform the de-escalation by updating the chat log 422 to describe the de-escalation, add the chat to a chat queue serviced by virtual agents (thereby enabling the virtual agent proxy module 108 to add a virtual agent to the chat), and transmit a notification message 472 to the client device 104 to notify the end user of the de-escalation. This flow may then continue once again at circle 'A1' or circle 'A2'.

IV. Exemplary Methods

Exemplary methods are now presented in accord with some embodiments of the invention from the perspective of various entities within the improved real-time chat system disclosed herein. The operations of these flow diagrams are described with reference to the exemplary embodiments of the other diagrams. However, it should be understood that the operations of these flow diagrams can be performed by embodiments of the invention other than those discussed with reference to these other diagrams, and the embodiments of the invention discussed with reference these other diagrams can perform operations different than those discussed with reference to the flow diagrams. Though the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Figure 5:
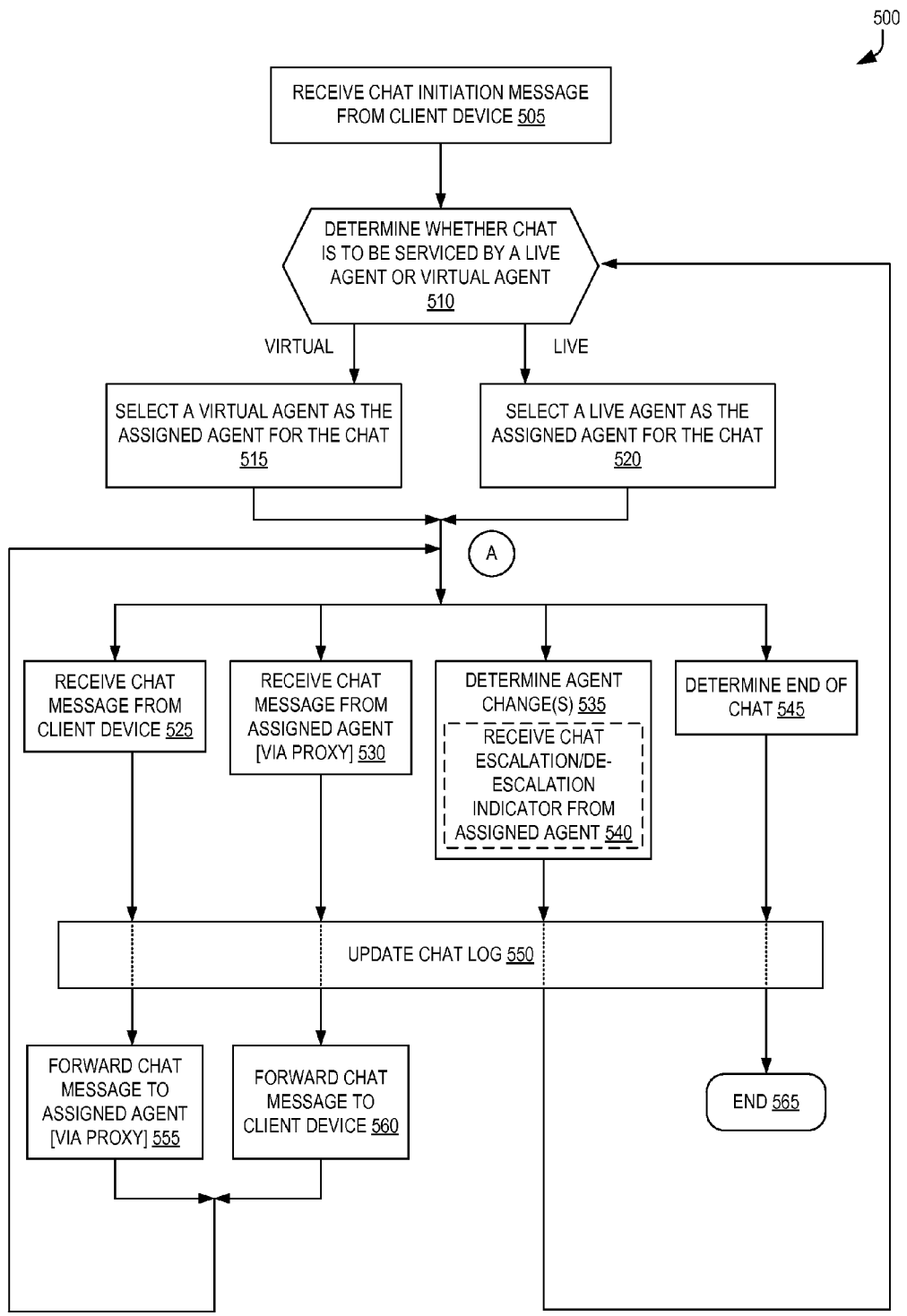
FIG. 5 illustrates a flow in a chat server of an improved real-time chat service according to some embodiments of the present invention.

FIG. 5 illustrates a flow 500 in a chat server 102 of an improved real-time chat service according to some embodiments of the present invention. The processing depicted in FIG. 5 may be implemented in software (e.g., code, instructions, program) executed by one or more processing units (e.g., processor cores), hardware, or combinations thereof. The software may be stored in memory (e.g., on a memory device, on a non-transitory computer-readable storage medium, etc.). The particular series of processing steps depicted in FIG. 5 is not intended to be limiting. In one embodiment, the processing depicted in FIG. 5 is performed by the chat server 102 depicted in FIG. 1 and/or FIG. 2.

This flow 500 includes, at block 505, receiving a chat initiation message from a client device. The chat initiation message may comprise an HTTP request message generated responsive to the end user viewing, receiving, or interacting with a webpage from a merchant website.

At block 510, the flow 500 includes determining whether the chat is to be serviced by a live agent or a virtual agent. In an embodiment, the chat server 102, based upon the chat initiation message and a set of chat rules 214, selects a chat queue for the chat that is designated a virtual agent queue and/or a live agent queue (that may be associated with one or more live agents).

In the case that the chat is assigned to chat queue designated as a virtual agent queue, the chat server 102, at block 515, selects a virtual agent as the assigned agent for the chat. In some embodiments, block 515 is performed by the virtual agent proxy module 108, which causes a mapping of that assigned virtual agent to the chat to be created. In the case that the chat is assigned to chat queue designated as a live agent queue, the chat server 102, at block 520, selects a live agent as the assigned agent for the chat. Block 520 may include notifying one or more live agents of the chat and receiving a chat acceptance message from one of the live agents, or may include unilaterally assigning the chat to a live agent associated with the chat queue. At this point, the chat has been initiated.

The chat server 102, at circle 'A' may, at block 525, receive a chat message from the client device 106 of the end user. After updating the chat log at block 550 based upon the chat message, the chat server 102 forwards the chat message to the assigned agent at block 555. In the case that the assigned agent is a virtual agent, this forwarding may occur via the virtual agent proxy module 108.

The chat server 102, at circle 'A' may also, at block 530, receive a chat message from the assigned agent. In the case that the assigned agent is a virtual agent, this may occur via the virtual agent proxy module 108. After updating the chat log at block 550 based upon the chat message, the chat server 102 forwards the chat message to the client device at block 560.

The chat server 102, at circle 'A' may also, at block 535, determine a need to change the set of assigned agents. In some embodiments, block 535 includes block 540, where the chat server 102 receives a chat escalation or chat de-escalation indicator from the currently-assigned agent. In some embodiments, block 535 includes the chat server 102 determining that an escalation or de-escalation is to occur based upon an application of one or more escalation rules to one or more chat messages causing the rule(s) to be triggered. The chat server 102 may then update the chat log 550 based upon the determination of block 535, and the flow may continue with block 510 and block 515 or 520, where the chat server 102 may cause a new live or virtual agent to be added to the chat as described above, and/or cause the existing agent to be removed from the chat.

The chat server 102, at circle 'A' may also, at block 545, determine that the chat is to end. In an embodiment, block 545 includes receiving a chat termination message from the client device, a live agent client device, or a virtual agent. The chat server 102 then, in this depicted flow, update the chat log 550 to indicate a completion of the chat, and the flow ends at block 565.

Figure 6:
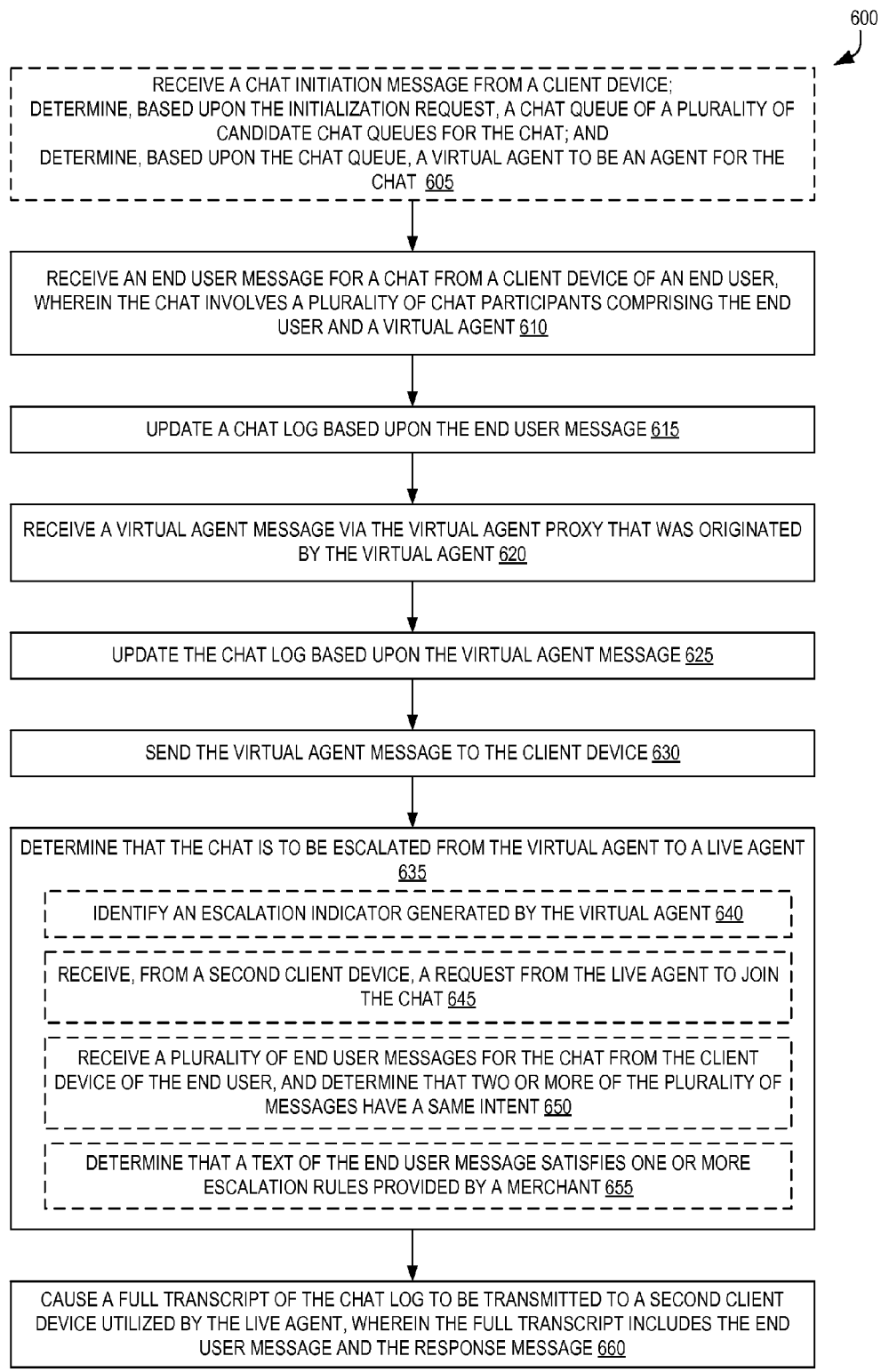
FIG. 6 illustrates a flow in an improved real-time chat service utilizing a virtual agent proxy according to some embodiments of the present invention.

As another example, FIG. 6 illustrates a flow 600 in an improved real-time chat service utilizing a virtual agent proxy according to some embodiments of the present invention. The processing depicted in FIG. 6 may be implemented in software (e.g., code, instructions, program) executed by one or more processing units (e.g., processor cores), hardware, or combinations thereof. The software may be stored in memory (e.g., on a memory device, on a non-transitory computer-readable storage medium, etc.). The particular series of processing steps depicted in FIG. 6 is not intended to be limiting. In one embodiment, the processing depicted in FIG. 6 is performed by the chat server 102 depicted in FIGS. 1 and 2.

Flow 600 optionally includes, at block 605, receiving a chat initiation message from a client device and determining, based upon the chat initialization request, a chat queue of a plurality of "candidate" (or potential) chat queues for the chat to be placed in. Then, based upon the determined chat queue, a virtual agent to be an agent for the chat is determined.

At block 610, the flow includes receiving an end user message for the chat from a client device of an end user. The end user message may be an alphanumeric message composed by the end user via a chat user interface module 107. The chat involves a plurality of chat participants comprising the end user and a virtual agent.

At block 615, the flow 600 includes updating a chat log based upon the end user message. In an embodiment, the chat log includes a transcript of all end user messages and all agent messages for the chat, and may also include other chat event information including, but not limited to, dates/times associated with the beginning and/or end of the chat, dates/times of each message in the chat, indicators of the participants in the chat, indicators of escalation and/or de-escalation events occurring in the chat, etc.

At block 620, the flow 600 includes receiving a virtual agent message via the virtual agent proxy that was originated by the virtual agent, and at block 625 the chat log is updated based upon the virtual agent message, and at block 630 the virtual agent message is sent to the client device.

At block 635, the flow 600 includes determining that the chat is to be escalated from the virtual agent to a live agent In one embodiment, block 635 includes block 640, in which the chat server 102 identifies an escalation indicator received by the chat server 102 that was generated by the virtual agent.

In one embodiment, block 635 includes block 645, in which a request from the live agent to join the chat is received from a second client device. In some embodiments, the live agent was already "supervising" the chat and silently observing the chat via the chat log or a dashboard module provided by the reporting and analysis module 212 of the chat server 102.

In one embodiment, block 635 includes block 650, in which the chat server 102 receives a plurality of end user messages for the chat from the client device of the end user, and determines that two or more of the plurality of messages have a same intent. In some embodiments, determining the intent of each message includes performing natural language processing routines upon the message to generate the intent, which may comprise a data structure representing the message, such as a generated parse tree of the message or another representation thereof In one embodiment, block 635 includes block 655, in which the chat server 102 determines that a text of the end user message satisfies one or more escalation rules provided by a merchant.

After the determining that the chat is to be escalated in block 635, the flow 600 includes block 660, in which the chat server 102 causes a full transcript of the chat log to be transmitted to the second client device utilized by the live agent. The full transcript includes the end user message and the response message, and may be generated based upon the chat log or comprise the chat log itself.

In some embodiments, the chat server 102 further removes the virtual agent from the chat.

V. Exemplary Systems

Figure 7:
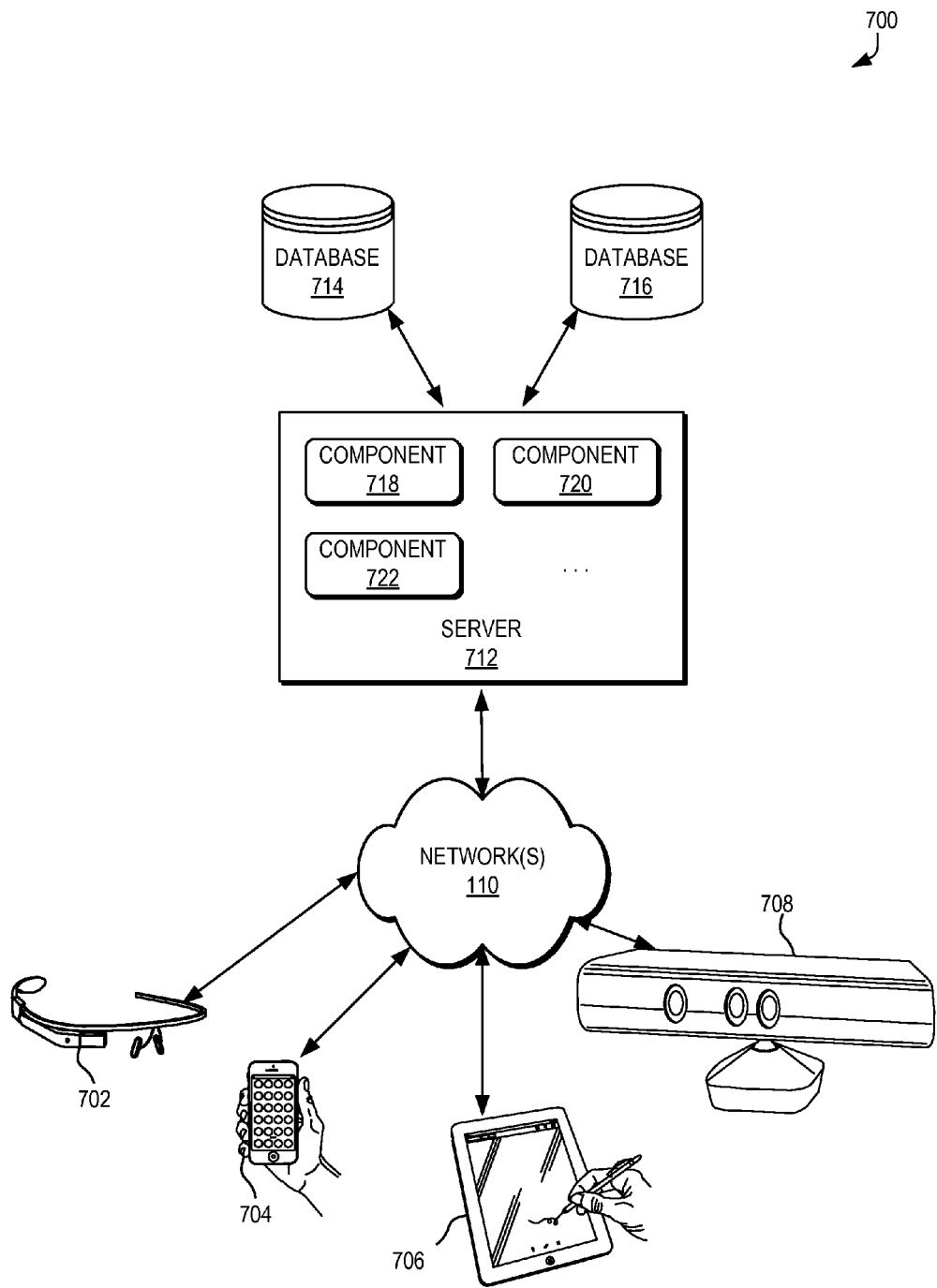
FIG. 7 illustrates a simplified diagram of a distributed system for implementing some embodiments of the present invention.

FIG. 7 illustrates a simplified diagram of a distributed system for implementing some embodiments of the present invention. In the illustrated embodiment, distributed system 700 includes one or more client computing devices 702, 704, 706, and 708 (examples of client device 104), which are configured to execute and operate a client application (e.g., application 105) such as a web browser, proprietary client (e.g., Oracle Forms), or the like over one or more network(s) 110. Server 712 (e.g., chat server 102) may be communicatively coupled with remote client computing devices 702, 704, 706, and 708 via network 110.

In various embodiments, server 712 may be adapted to run one or more services or software applications such as services and applications that provide the improved real-time chat service system processing. In certain embodiments, server 712 may also provide other services or software applications that can include non-virtual and virtual environments. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

Client computing devices 702, 704, 706, and/or 708 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 110.

Although distributed system 700 in FIG. 7 is shown with four client computing devices, any number of client computing devices may be supported. Other devices, such as devices with sensors, etc., may interact with server 712.

Network(s) 110 in distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various embodiments, server 712 may be adapted to run one or more services or software applications described in the foregoing disclosure. For example, server 712 may correspond to a server for performing processing as described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. These databases may provide a mechanism for storing information such as user interactions information, usage patterns information, adaptation rules information, and other information used by embodiments of the present invention. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
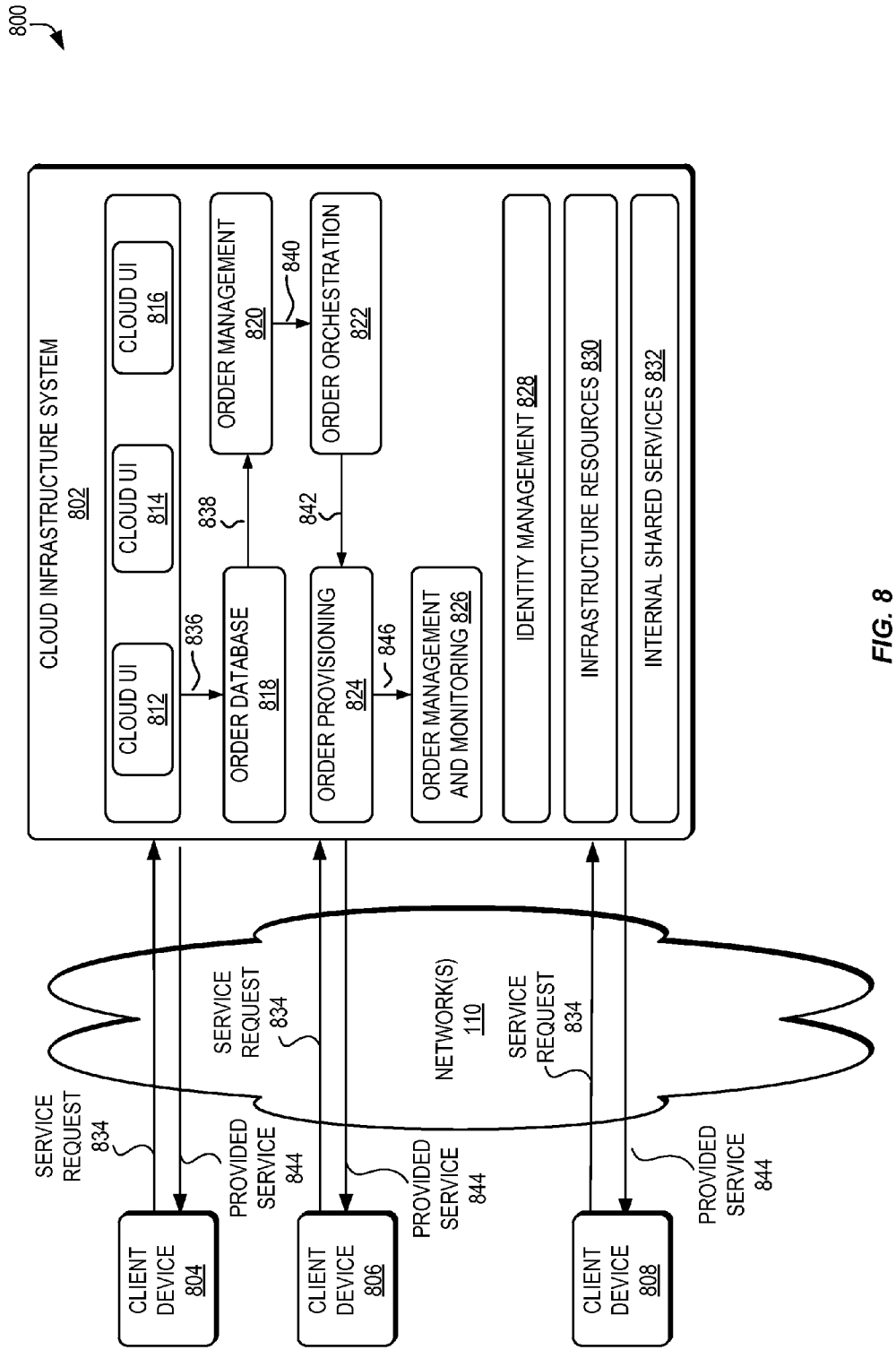
FIG. 8 is a simplified block diagram of one or more components of a system environment in which services may be offered as cloud services, in accordance with some embodiments of the present invention.

In some embodiments, the improved real-time chat service system utilizing a virtual agent proxy may be offered as services via a cloud environment. FIG. 8 is a simplified block diagram of one or more components of a system environment 800 in which services may be offered as cloud services, in accordance with some embodiments of the present disclosure. In the illustrated embodiment in FIG. 8, system environment 800 includes one or more client computing devices 804, 806, and 808 that may be used by users to interact with a cloud infrastructure system 802 that provides cloud services, including services for the improved real-time chat service system such as the chat server 102, virtual agent proxy module 108, one or more virtual agents 114A-114N, etc. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 802, 804, 806, and 808. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 110 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 110.

In certain embodiments, services provided by cloud infrastructure system 802 may include a host of services that are made available to users of the cloud infrastructure system on demand. In addition to services related to providing the improved real-time chat service, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 818 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 822 to be isolated from implementation details, such as whether or not services and resources are actually provisioned on the fly or pre-provisioned and only allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
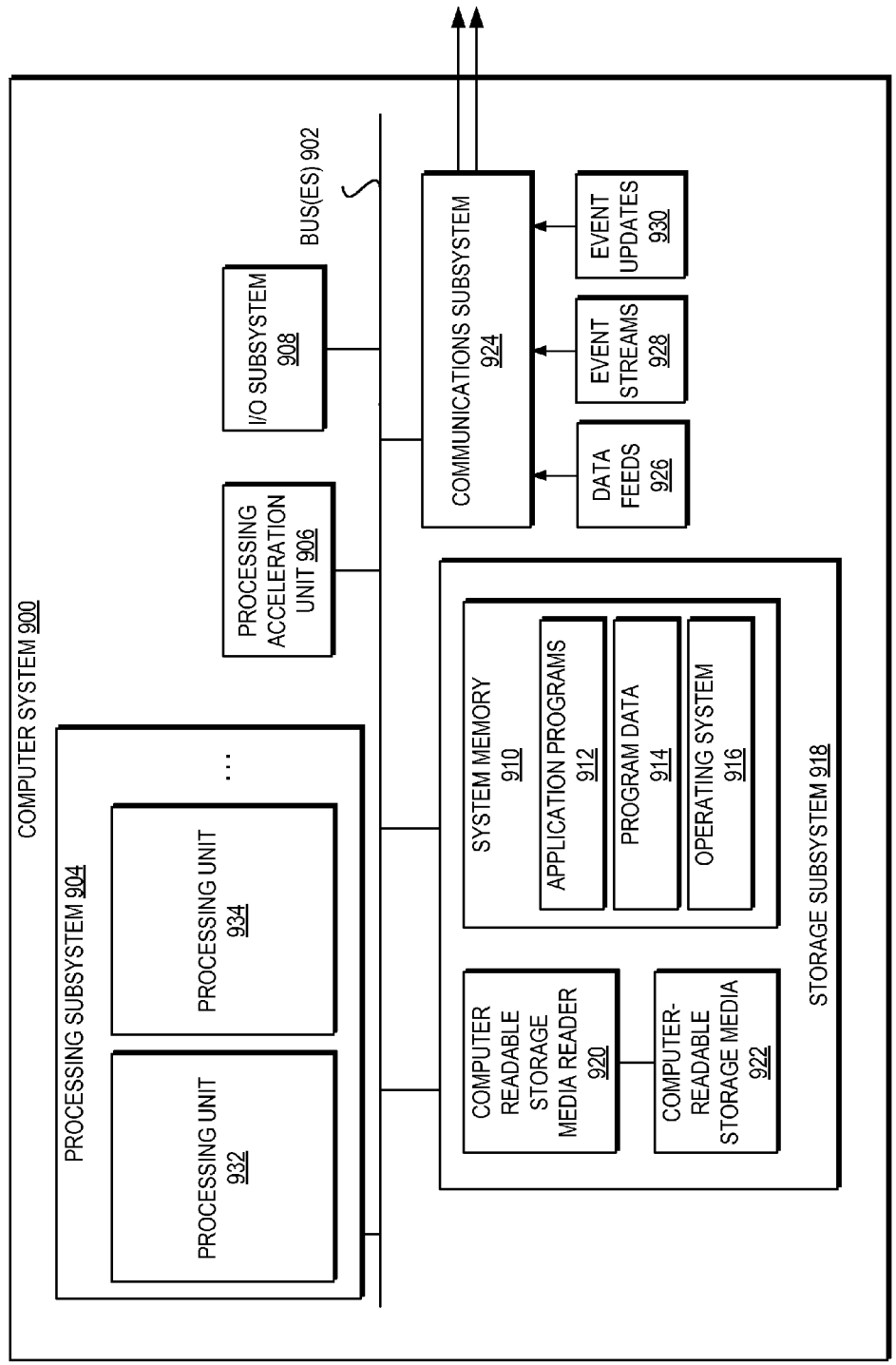
FIG. 9 illustrates an exemplary computer system that may be used to implement certain components according to some embodiments of the present invention.

FIG. 9 illustrates an exemplary computer system 900 that may be used to implement certain components according to some embodiments of the present invention. In some embodiments, computer system 900 may be used to implement any of the various servers and computer systems described above. As shown in FIG. 9, computer system 900 includes various subsystems including a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors (GPUs), digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above for providing the improved real-time chat service system utilizing a virtual agent proxy.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking") while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present invention.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   receiving, at a chat server-executing at a computing device, a first message for a chat from a client device of an end user, wherein the chat involves a plurality of chat participants comprising the end user and a virtual agent;
   updating, by the chat server, a chat log based upon the first message;
   sending, by the chat server, the first message to the virtual agent via a virtual agent proxy;
   receiving, at the chat server, a second message via the virtual agent proxy that was originated by the virtual agent in response to the first message;
   updating, by the chat server, the chat log based upon the second message;
   sending, by the chat server, the second message to the client device;
   determining, by the chat server, that the chat is to be escalated from the virtual agent to a live agent; and
   causing a full transcript of the chat log to be transmitted to a second client device utilized by the live agent for continuation of the chat, wherein the full transcript includes the first message and the second message.

2. The method of claim 1, wherein said determining that the chat is to be escalated comprises identifying an escalation indicator generated by the virtual agent.

3. The method of claim 2, wherein said escalation indicator is a part of the second message.

4. The method of claim 1, wherein said determining that the chat is to be escalated comprises receiving, from the second client device, a request from the live agent to join the chat.

5. The method of claim 1, further comprising:
   removing, by the chat server, the virtual agent from the chat; and
   adding, by the chat server, the live agent to the chat.

6. The method of claim 1, wherein said determining that the chat is to be escalated comprises:
   receiving, at the chat server, a plurality of end user messages for the chat from the client device of the end user; and
   determining that two or more of the plurality of end user messages have a same intent.

7. The method of claim 1, wherein:
   said determining that the chat is to be escalated comprises determining that a text of the first message satisfies one or more escalation rules provided by a merchant; and
   the end user participates in the chat via a chat user interface module displayed over or within a web page of the merchant.

8. The method of claim 1, further comprising:
   determining, by the chat server, that the chat is to be de-escalated from the live agent to the virtual agent;
   removing, by the chat server, the live agent from the chat; and
   adding, by the chat server, the virtual agent to the chat.

9. The method of claim 1, wherein the live agent is a first live agent and wherein said determining that the chat is to be escalated comprises:
   receiving, from a second live agent, a request to monitor the chat; and
   providing, to a third client device of the second live agent, the full transcript of the chat log, wherein the end user and the first live agent are not presented with any information by the chat server identifying the second live agent.

10. The method of claim 1, further comprising:
    receiving, from the client device of the end user, an initialization request to create the chat;
    determining, based upon the initialization request, a chat queue of a plurality of candidate chat queues for the chat; and
    determining, based upon the chat queue, that an agent for the chat is the virtual agent.

11. A non-transitory computer readable storage medium storing instructions that, when executed by one or more processors of a computing device, cause the computing device to execute a chat server and perform operations comprising:
    receiving, at the chat server, a first message for a chat from a client device of an end user, wherein the chat involves a plurality of chat participants comprising the end user and a virtual agent;
    updating, by the chat server, a chat log based upon the first message;
    sending, by the chat server, the first message to the virtual agent via a virtual agent proxy;
    receiving, at the chat server, a second message via the virtual agent proxy that was originated by the virtual agent in response to the first message;
    updating, by the chat server, the chat log based upon the second message;
    sending, by the chat server, the second message to the client device;
    determining, by the chat server, that the chat is to be escalated from the virtual agent to a live agent; and
    causing a full transcript of the chat log to be transmitted to a second client device utilized by the live agent for continuation of the chat, wherein the full transcript includes the first message and the second message.

12. The non-transitory computer readable storage medium of claim 11, wherein:
    said determining that the chat is to be escalated comprises identifying an escalation indicator generated by the virtual agent; and
    said escalation indicator is a part of the second message.

13. The non-transitory computer readable storage medium of claim 11, wherein said determining that the chat is to be escalated comprises receiving, from the second client device, a request from the live agent to join the chat.

14. The non-transitory computer readable storage medium of claim 11, wherein said determining that the chat is to be escalated comprises:
    receiving, at the chat server, a plurality of end user messages for the chat from the client device of the end user; and
    determining that two or more of the plurality of end user messages have a same intent.

15. The non-transitory computer readable storage medium of claim 11, wherein:
    said determining that the chat is to be escalated comprises determining that a text of the first message satisfies one or more escalation rules provided by a merchant; and
    the end user participates in the chat via a chat user interface module displayed over or within a web page of the merchant.

16. The non-transitory computer readable storage medium of claim 11, wherein the operations further comprise:
    determining, by the chat server, that the chat is to be de-escalated from the live agent to the virtual agent;
    removing, by the chat server, the live agent from the chat; and
    adding, by the chat server, the virtual agent to the chat.

17. The non-transitory computer readable storage medium of claim 11, wherein the live agent is a first live agent and wherein said determining that the chat is to be escalated comprises:
    receiving, from a second live agent, a request to monitor the chat; and
    providing, to a third client device of the second live agent, the full transcript of the chat log, wherein the end user and the first live agent are not presented with any information by the chat server identifying the second live agent.

18. The non-transitory computer readable storage medium of claim 11, wherein the operations further comprise:
    receiving, from the client device of the end user, an initialization request to create the chat;
    determining, based upon the initialization request, a chat queue of a plurality of candidate chat queues for the chat; and
    determining, based upon the chat queue, that an agent for the chat is the virtual agent.

19. A system, comprising:
    a chat server executing at a computing device and facilitating chats each involving a plurality of chat participants, the computing device comprising one or more network interfaces for transmitting and receiving messages across a communications network, wherein the chat server:
    receives user messages for the chats from one or more client devices of one or more end users, wherein each of the chats includes one of the one or more end users and one of one or more virtual agents assigned to the chat;

updates chat logs based upon the received user messages;

sends the user messages to corresponding virtual agents assigned to the chats via a virtual agent proxy of the chat server;

receives virtual agent messages via the virtual agent proxy that were originated by the corresponding virtual agents in response to the corresponding user messages;

updates the chat logs based upon the virtual agent messages;

sends the virtual agent messages to the corresponding client devices;

determines whether the chats are to be escalated from the virtual agents to one or more live agents; and causes, upon determining that the chats are to be escalated, full transcripts of the corresponding chat logs to be transmitted to corresponding client devices utilized by the corresponding live agents for continuation of the chats, wherein each of the full transcripts includes each of the received user messages of the chat and each of the received virtual agent messages of the chat.

20. The system of claim 19, wherein the chat server determines whether the chats are to be escalated by identifying an escalation indicator generated by the virtual agents within the virtual agent messages.

* * * * *

UNITED STATES PATENT AND TRADEMARK OFFICE
CERTIFICATE OF CORRECTION

PATENT NO. : 9,559,993 B2  
APPLICATION NO. : 14/505286  
DATED : January 31, 2017  
INVENTOR(S) : Palakovich et al.

Page 1 of 1

It is certified that error appears in the above-identified patent and that said Letters Patent is hereby corrected as shown below:

On the Title Page

On page 2, Column 2, item (56), under Other Publications, Line 5, delete "/m-virtual" and insert -- /rn-virtual --, therefor.

In the Specification

In Column 1, Line 51, after "1-800-..."" insert -- . --.

In Column 10, Line 39, delete "116A0116K." and insert -- 116A-116K.- --, therefor.

In Column 21, Line 67, after "live agent" insert -- . --.

In Column 22, Line 21, after "thereof" insert -- . --.

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*